(12) United States Patent
Kunze

(10) Patent No.: US 10,703,341 B2
(45) Date of Patent: Jul. 7, 2020

(54) VEHICLE SENSOR HOUSING WITH THEFT PROTECTION

(71) Applicant: MAGNA ELECTRONICS INC., Auburn Hills, MI (US)

(72) Inventor: Norbert Kunze, Diez (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 239 days.

(21) Appl. No.: 15/886,874

(22) Filed: Feb. 2, 2018

(65) Prior Publication Data

US 2018/0222450 A1 Aug. 9, 2018

Related U.S. Application Data

(60) Provisional application No. 62/508,007, filed on May 18, 2017, provisional application No. 62/477,575, filed on Mar. 28, 2017, provisional application No. 62/454,215, filed on Feb. 3, 2017.

(51) Int. Cl.
*B60S 1/48* (2006.01)
*B60S 1/50* (2006.01)
*B60S 1/56* (2006.01)
*B60S 1/52* (2006.01)

(52) U.S. Cl.
CPC ............... *B60S 1/481* (2013.01); *B60S 1/50* (2013.01); *B60S 1/56* (2013.01); *B60S 1/52* (2013.01)

(58) Field of Classification Search
None
See application file for complete search history.

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |

(Continued)

FOREIGN PATENT DOCUMENTS

| | | |
|---|---|---|
| WO | 2011090484 A1 | 7/2011 |
| WO | 2018007995 A1 | 1/2018 |

*Primary Examiner* — Derek S. Chapel
(74) *Attorney, Agent, or Firm* — Honigman LLP

(57) ABSTRACT

A sensing system for a vehicle includes a sensor module configured to be disposed at the vehicle. The sensor module includes a sensor disposed in a housing, which includes a mounting portion and a cover portion. The mounting portion is configured to attach at a portion of the vehicle such that the cover portion is at an exterior of the vehicle. The cover portion is removably attached at the mounting portion and includes tamper resistant attaching elements such that an attempt to remove the cover portion or sensor module damages the sensor module. The sensor module may include a washer nozzle for directing pressurized fluid or spray onto a window of the sensor module. Responsive to an output of the sensor, a control determines the presence of one or more objects exterior the vehicle and within the field of sensing of the sensor.

23 Claims, 32 Drawing Sheets

(56) References Cited

U.S. PATENT DOCUMENTS

| | | |
|---|---|---|
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,252,703 B2 * | 4/2019 | Ina ................ B60S 1/522 |
| 2003/0222156 A1 * | 12/2003 | Bissonnette ........ B60S 1/481 239/284.1 |
| 2007/0236364 A1 * | 10/2007 | Hubbard ............ B60Q 9/005 340/932.2 |
| 2009/0122141 A1 * | 5/2009 | Nakamura ........... B60R 11/04 348/148 |
| 2010/0001897 A1 | 1/2010 | Lyman |
| 2010/0245066 A1 | 9/2010 | Sarioglu et al. |
| 2012/0062743 A1 | 3/2012 | Lynam et al. |
| 2012/0117745 A1 * | 5/2012 | Hattori ............. B60S 1/0848 15/250.01 |
| 2012/0218412 A1 | 8/2012 | Dellantoni et al. |
| 2013/0215271 A1 | 8/2013 | Lu |
| 2013/0222592 A1 | 8/2013 | Gieseke |
| 2014/0158731 A1 * | 6/2014 | Squire ................ B60R 11/04 224/545 |
| 2014/0218529 A1 | 8/2014 | Mahmoud et al. |
| 2014/0375476 A1 | 12/2014 | Johnson et al. |
| 2015/0078940 A1 * | 3/2015 | Kikuta ............... B60S 1/528 417/432 |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0272163 A1 * | 9/2016 | Dreiocker ............ B60S 1/56 |
| 2017/0129489 A1 | 5/2017 | Pawlicki et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0105176 A1 | 4/2018 | Pawlicki et al. |
| 2018/0172878 A1 * | 6/2018 | Hsiao ................. G08G 1/142 |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0100171 A1 * | 4/2019 | Ina ................... B08B 3/02 |
| 2019/0217775 A1 | 7/2019 | May et al. |
| 2019/0337466 A1 * | 11/2019 | Oba .................. B60R 1/00 |

* cited by examiner

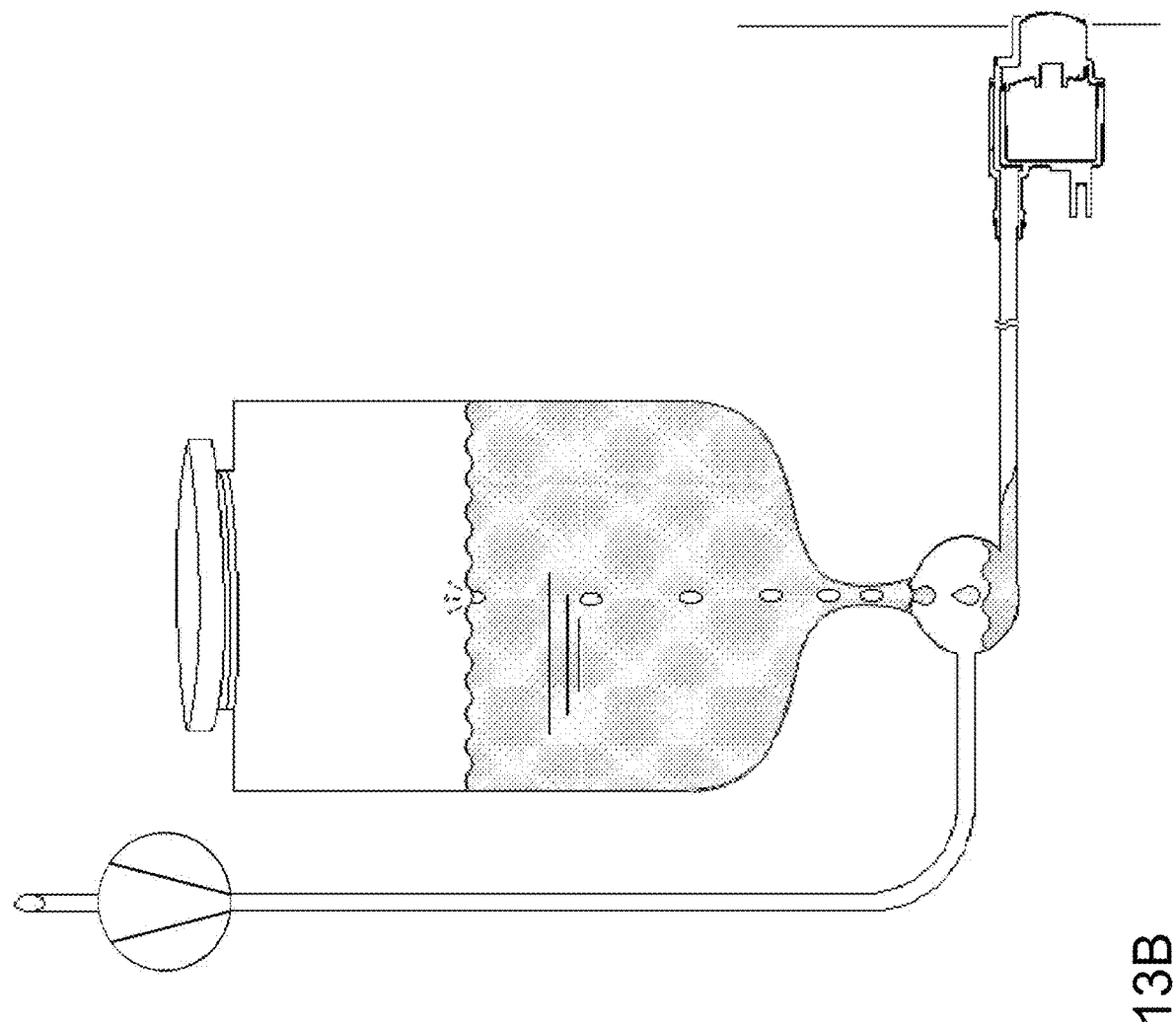

Legend

⇨ Air pressure force

⇦ Water pressure force

↓ Air flow

↓ Water flow

Legend

⇨  Air pressure force

⇦  Water pressure force

↓  Air flow

▼  Water flow

VEHICLE SENSOR HOUSING WITH THEFT PROTECTION

CROSS REFERENCE TO RELATED APPLICATIONS

The present application is related to U.S. provisional applications, Ser. No. 62/508,007, filed May 18, 2017, Ser. No. 62/477,575, filed Mar. 28, 2017, and Ser. No. 62/454,215, filed Feb. 3, 2017, which are hereby incorporated herein by reference in their entireties.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module disposed at the vehicle to sense a respective region exterior of the vehicle, with the sensor module comprising at least one of a Lidar (Light Detection And Ranging) sensor, a visual camera sensor, an near infrared camera sensor, a far infrared camera sensor and a RADAR sensor disposed outbound in a housing. The sensor module includes a housing having a mounting portion and a cover portion, with the mounting portion configured to attach at a portion of the equipped vehicle such that the cover portion is at an exterior of the vehicle. The cover portion is removably attached at the mounting portion and includes tamper resistant attaching elements such that an attempt to remove the cover portion or sensor module damages the sensor module.

Optionally, the cover portion may snap attach at the mounting portion to seal the sensor and associated circuitry therein. Optionally, the cover portion may be removable from the mounting portion via a plurality of release rods that are insertable through release holes established through the cover portion.

Optionally, the housing includes a fluid port for connecting to a fluid supply such that, responsive to fluid supplied to the fluid port, channels or passageways in the housing direct fluid onto a window of the cover portion through which the sensor senses. The fluid port may be part of the mounting portion of the housing, and the cover portion may include a fluid channel that is in fluid communication with a fluid channel of the fluid port when the cover portion is attached at the mounting portion. Optionally, the housing may include a second fluid port for providing a second medium at the sensor module. The fluid supplied at the fluid port may comprise a liquid (such as cleaning water or the like) and the second medium provided at the second fluid port may comprise pressurized air and/or heated steam or air for heating at least a portion of the sensor module. Optionally, both media (such as cleaning water and air) may be pumped by a single pump.

These and other objects, advantages, purposes and features of the present invention will become apparent upon review of the following specification in conjunction with the drawings.

BRIEF DESCRIPTION OF THE DRAWINGS

FIGS. 13A and 13B are the sensor module's cleaning system of FIGS. 9A and 9B, respectively, shown refilling the reservoir;

FIG. 15A shows the condition when the reservoir is full and the air pump doesn't pump, FIG. 15B shows the condition when the air pump is on and the air pressure exceeds the liquid pressure, pushing the bracket towards the liquid intake, FIG. 15C shows the condition when the air pump is on and the bracket is fully shifted to the liquid intake, allowing the air to flow towards the reservoir, FIG. 15D shows the condition when the air pump is shut off and the liquid pressure exceeds the air pressure, pushing the bracket towards the air intake, and FIG. 15E shows the condition when the air pump is off and the bracket is fully shifted to the air intake, allowing the liquid to flow towards the reservoir until it is refilled;

FIG. 18 is a side-top view, FIG. 19 is a front view, FIG. 20 is a top view, FIG. 21 is a side-top view with the sheath heater device alone, and FIG. 22 is an exploded perspective view of the sheath heater device 50, shown with the electrical heating element 52 and the washing fluid or air canal 55;

Figure 1:
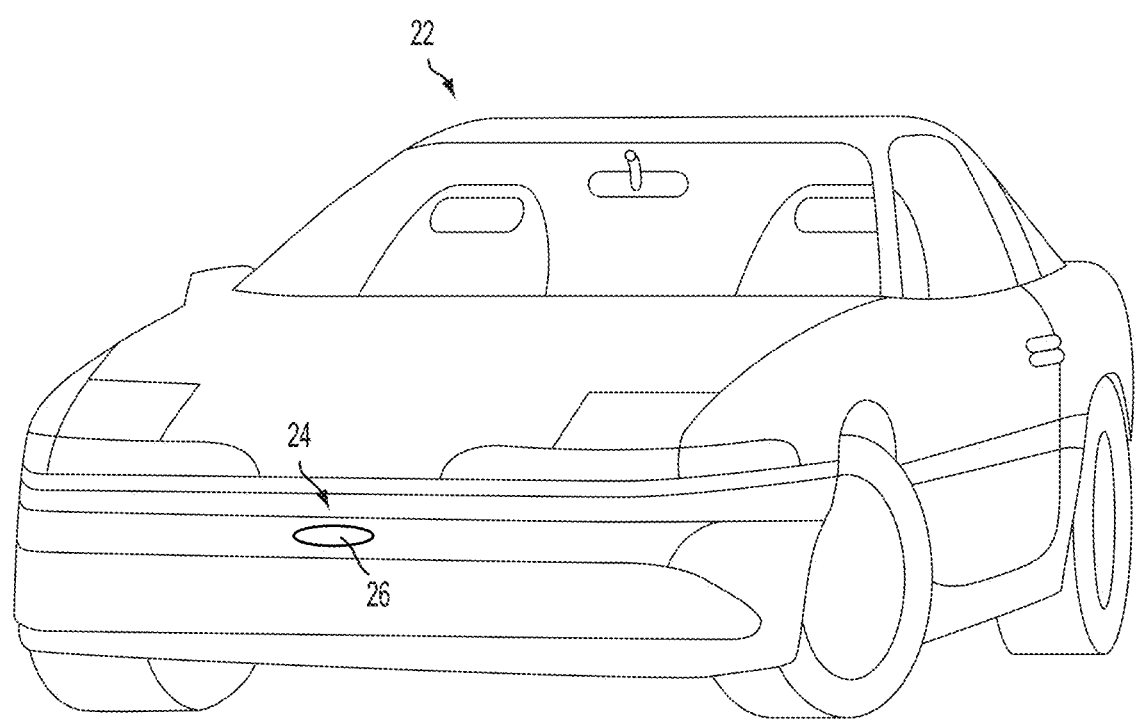
FIG. 1 is a perspective view of a vehicle with a sensing system that incorporates a sensor module in accordance with the present invention.

LEGEND 1 front lid
2 sealing
3 clips on the lid
4 clips edge on socket
5 water canal
6 water canal (cross hole)
7 nozzles
8 window
9 water canal
10 water supply
11 socket
12 O-shaped dip
13 opening water canal in the socket
14 release holes
15 second supply
16 opening second supply media to the canal
17 hard component
18 soft component
19 Lidar electronics PCB A
20 Lidar electronics PCB B
22 vehicle
24 sensing system
26 forward facing Lidar sensor unit
30 tank
31 main tank
32 reservoir
33 exiting hose
34 air hose
35 air pump
36 air intake
37 reservoir intake
38 neck
39 tank lid
40 lever valve
41 brick play valve
42 electrical heating element
43 air intake stopple
44 liquid intake stopple
50 sheath heater device
51 top lid
52 electrical heating element
53 outlet
54 inlet
55 canal
56 bottom lid
60 extendable dispenser assembly
61 intake
62 piston body
63 bypass section
64 tube
65 nozzle
66 water room
67 air room
68 stamp

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space (or to assist an autonomous vehicle control in controlling the vehicle autonomously or semi-autonomously). The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle), or controls one or more vehicle systems.

Referring now to the drawings and the illustrative embodiments depicted therein, a vehicle 22 includes an driver assistance system or sensing system 24 that includes at least one Lidar sensor unit, such as a forward facing Lidar sensor unit 26 (and the system may optionally include multiple exterior facing sensors, such as other Lidar sensors and/or other non-imaging sensors and/or cameras or imaging sensors, such as a rearward facing sensor at the rear of the vehicle, and a sideward/rearward facing sensor at respective sides of the vehicle), which sense regions exterior of the vehicle. The sensing system 24 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

The automotive Lidar sensor module of the present invention is configured to be mounted outside of the vehicle for detecting the environmental scene. Optionally, multiple Lidar sensor modules, possibly with identical housings, may come into use. A preferred location for these Lidar sensor modules to mount is within the bumpers and viewing or sensing outwardly. Generally, every design element at or in which a Lidar sensor can be hidden and has an effectual view opening is optionally a place for mounting a Lidar sensor, such as at the front grill, the head lights, the daytime running lights, a blinker, the license plate illumination, the tire housings, the vehicle emblem, the trunk lid opener handle, the door handles, the rearview mirrors or wing elements with rear view cameras at the place where usually the rearview mirrors were, the rooftop bars, the roof top antenna fins or the spoiler or the like.

Figure 2:
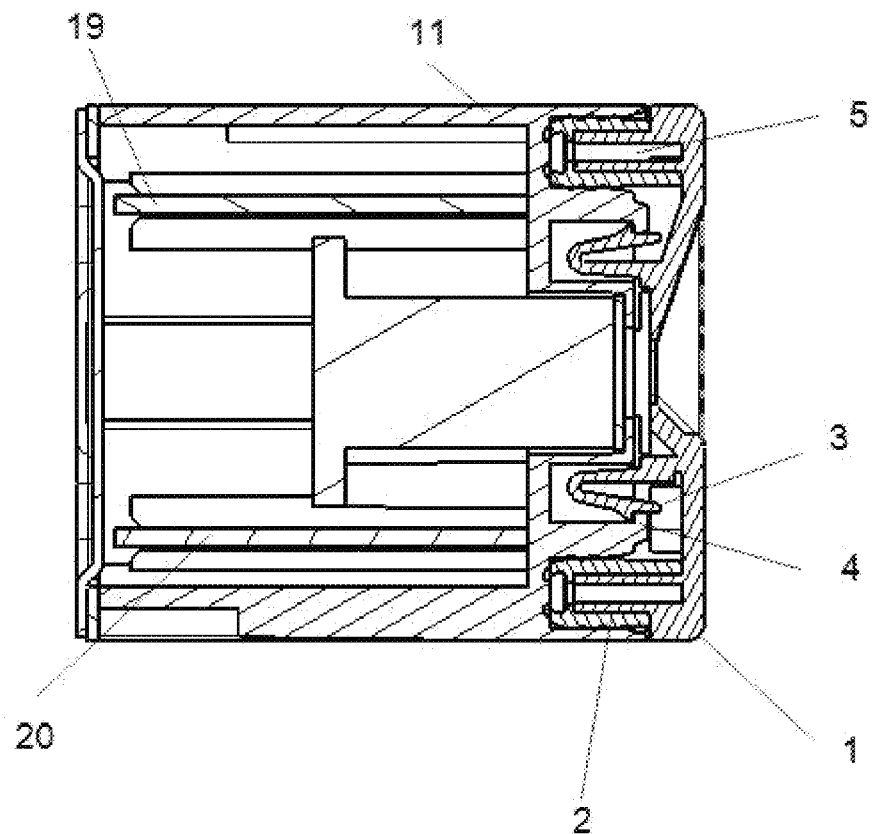
FIG. 2 is a sectional view of the sensor module of the present invention.
Figure 3:
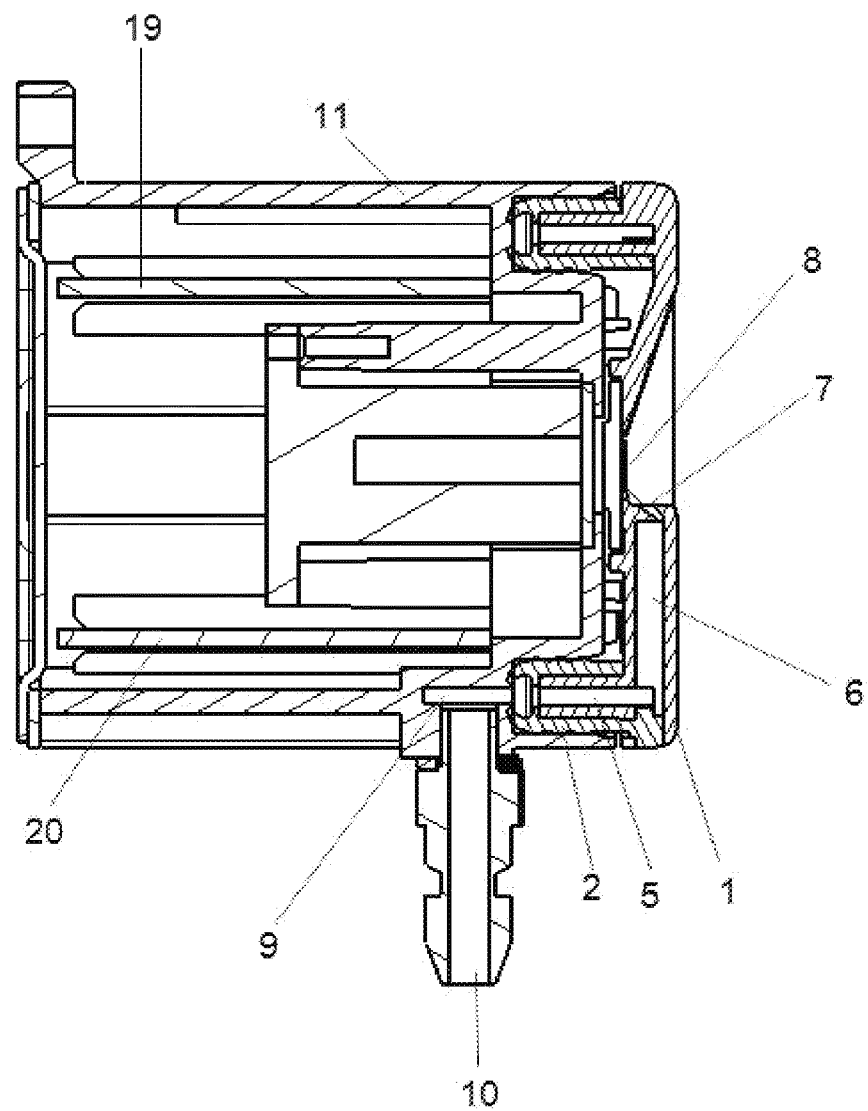
FIG. 3 is another sectional view of the sensor module.
Figure 4:
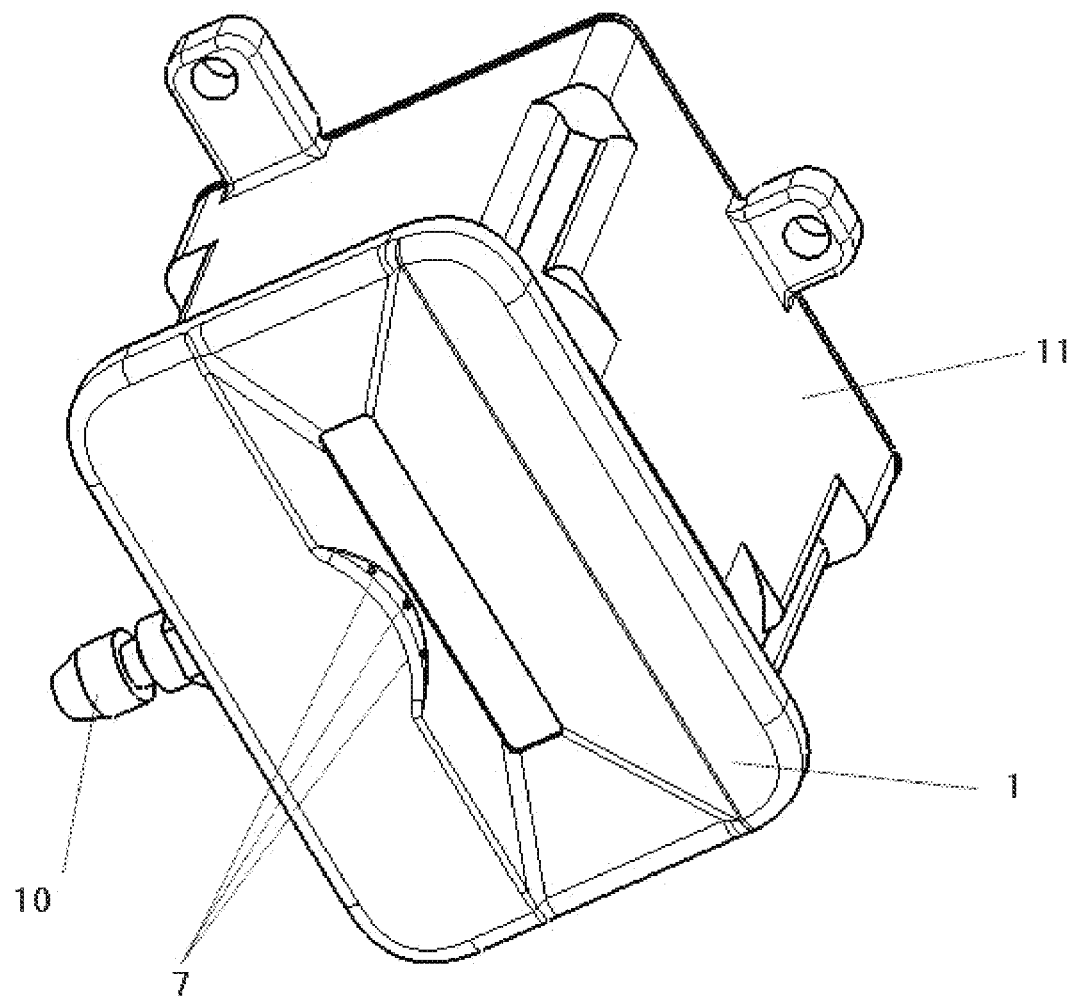
FIG. 4 is a perspective view of the sensor module.
Figure 5:
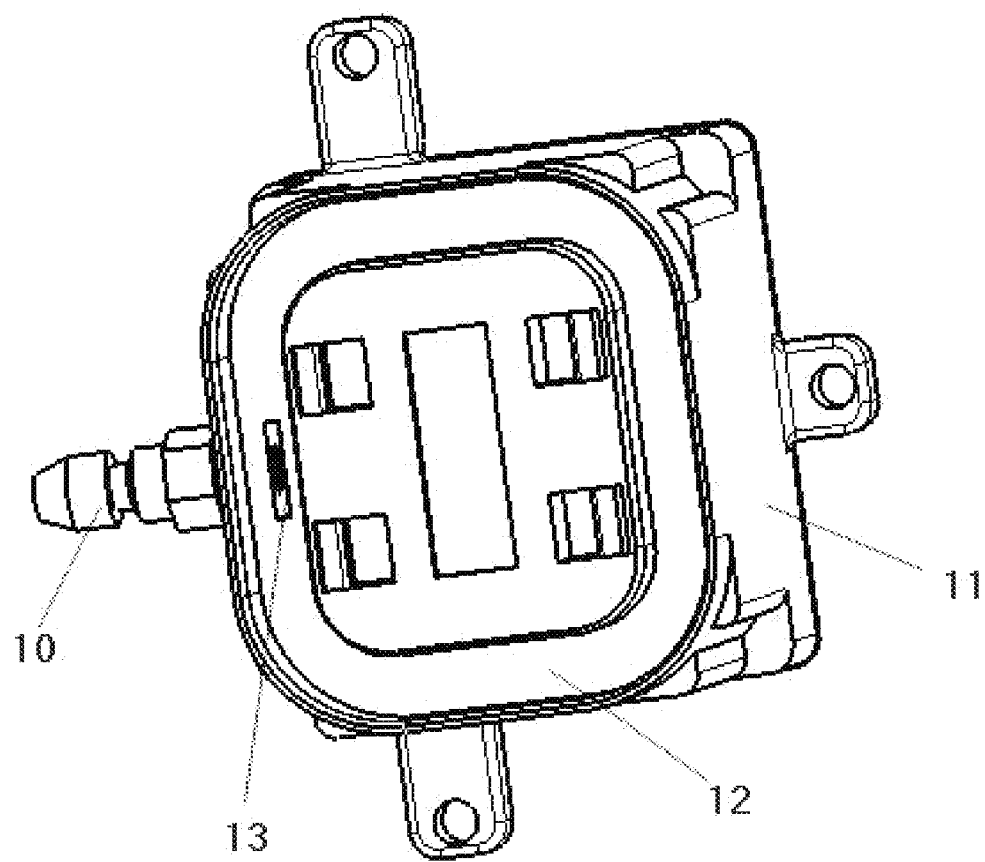
FIG. 5 is another perspective view of the sensor module.

In accordance with a first aspect of the present invention, the Lidar sensor housing of the present invention may have enhanced theft protection means. This may be beneficial since high quality Lidar sensors are very expensive and by that subject to theft. When mounting the Lidar sensor in a bumper, the Lidar housing's socket 11 (FIGS. 2-5) may be fixated or fixedly attached or mounted to the bumper structure. As shown in FIGS. 4 and 5, the socket shows three mounting flanges or feet which all have a through hole. The Lidar may be fixated by tightening or fastening the feet to the bumper structure, such as via screws, bolts, rivets, dowel pins or clips or the like. As an optional alternative, instead of feet with through holes, the Lidar housing may have clips for clipping the Lidar sensor to the bumper structure directly, preferably from behind, so that it is hard to disassemble from outside. The socket 11 houses the two Lidar printed circuit boards (PCBs) 19 and 20 (FIGS. 1 and 2). The optical components are directed toward the front lid window 8 (see FIGS. 3 and 4).

Figure 6:
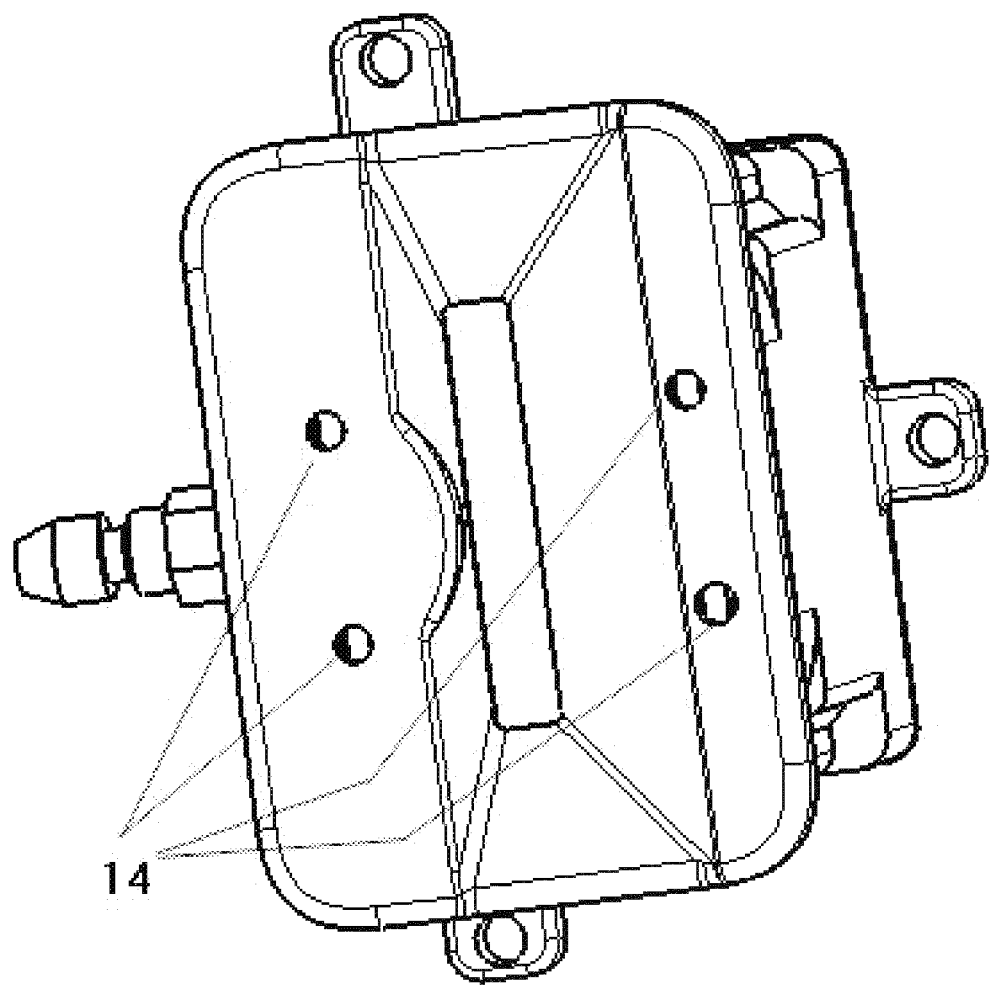
FIG. 6 is a perspective view of the sensor module, showing release holes.

The Lidar sensor module may comprise a socket part 11, which may be made out of aluminum as pressure die cast part, sinter part or rod profile part, as shown in FIG. 2. The socket part gets closed at the front by a front lid 1. The front lid includes four inward protruding clips 3, shown in FIGS. 2 and 7, which clip behind the clip's edges 4 and which are designed to not be removable without special measures. To reopen the front lid, four release rods have to be inserted into the release holes 14 (shown in FIG. 6), which then unlock the clips. By attaching the release rods, the front lid gets unusable and by that is uninteresting for a theft. Those release holes may be closed initially for design reasons or functional reasons and have to be pierced through when used for detaching the front lid.

Figure 7:
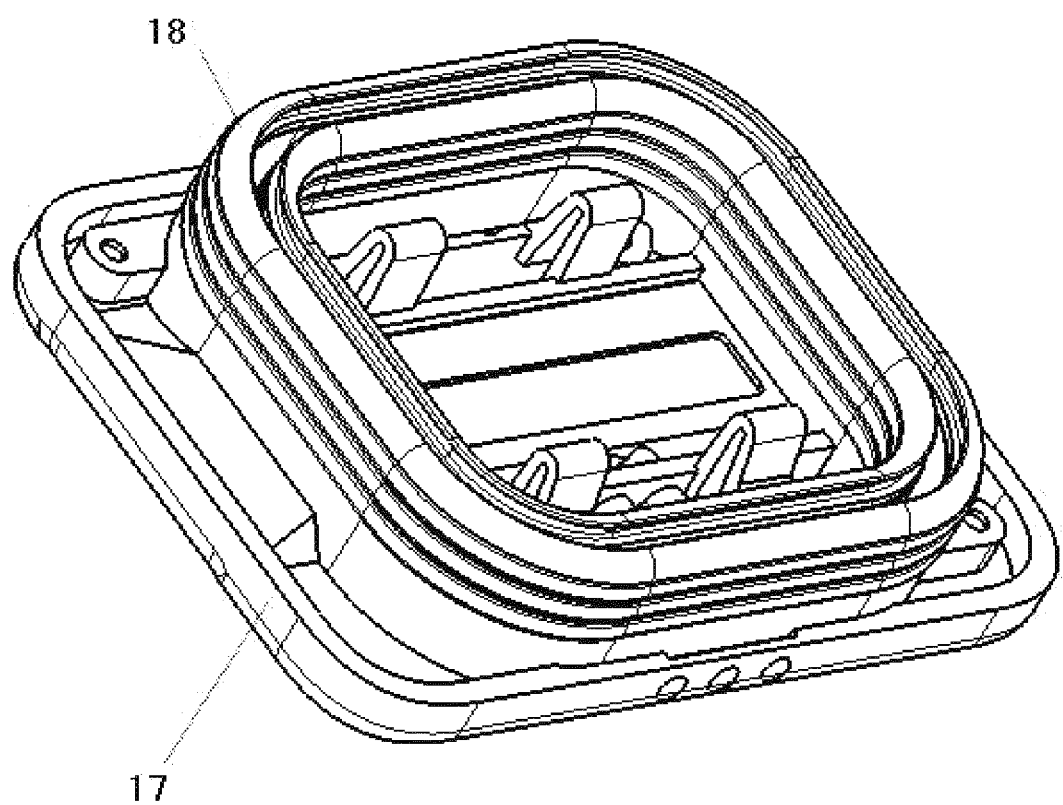
FIG. 7 is a perspective view of a cover or housing portion of the sensor module.

In the illustrated embodiment, the front lid includes a window 8. To keep the Lidar sensor clean for proper function the front lid has nozzles 7 for spilling water over the window's outside, such as shown in FIG. 4. The water comes from a supply port 10 and gets lead through the water canals or channels 9, 5 and 6 to the nozzles 7 shown in FIG. 3. The water from the supply is lead into the canals or channels via an opening 13 within the socket. The front lid may be done in a 2K molding process with a hard component 17 and a soft component 18, such as shown in FIG. 7. At the time the front lid gets attached to the socket, the two soft component lips recess on the inner and outer wall of the O-shaped dip 12 formed in the socket part forming the canal 5 (see FIGS. 2 and 3).

The water may flow by gravity or may get pumped by a separate pump, possibly attached to a separate reservoir similar or possibly identical to the reservoir for the windshield washer fluid. Optionally, the pump may be the identical to the pump for the windshield washer fluid. Optionally, the pump and/or the reservoir may be the identical to a head light washer fluid. Optionally, the pump and/or the reservoir may be the identical to a rear and or surround view fish eye camera washer fluid.

Figure 8:
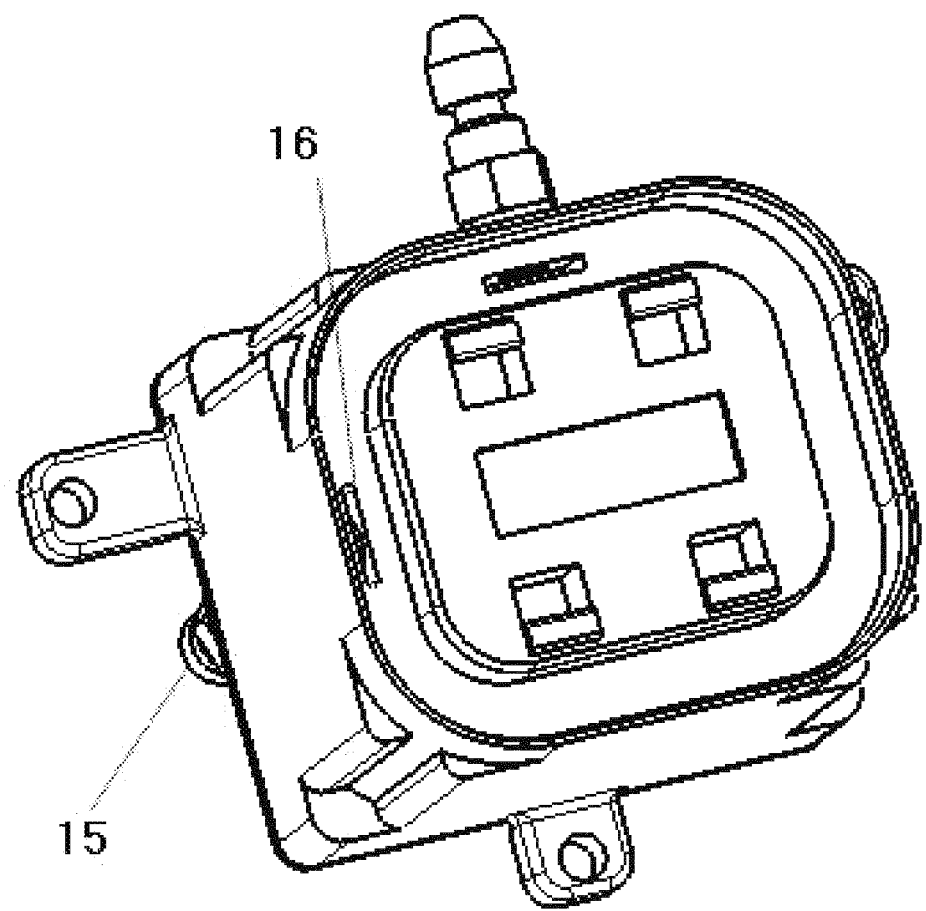
FIG. 8 is a perspective view of the sensor module.

As an optional addition, the (Lidar- or camera-) sensor housing may include a second supply 15 at which a second media can be put into the water canal for getting spilled out of the nozzles 7. The socket thus has another opening 16 to the canal or port 5, such as shown in FIG. 8. The second media may be a washing additive, a defrosting fluid or air. Optionally, the air may be supplied consecutively (both via the same supply or through a second supply) to the water spilling for once draining the canals from water, which is beneficial to keep it open in below freezing weather conditions and secondly may be beneficial to keep the (Lidar or camera-) sensor window clean by drawing water, ice, hail, snow or particles away from the window while driving the vehicle.

Figure 9A:
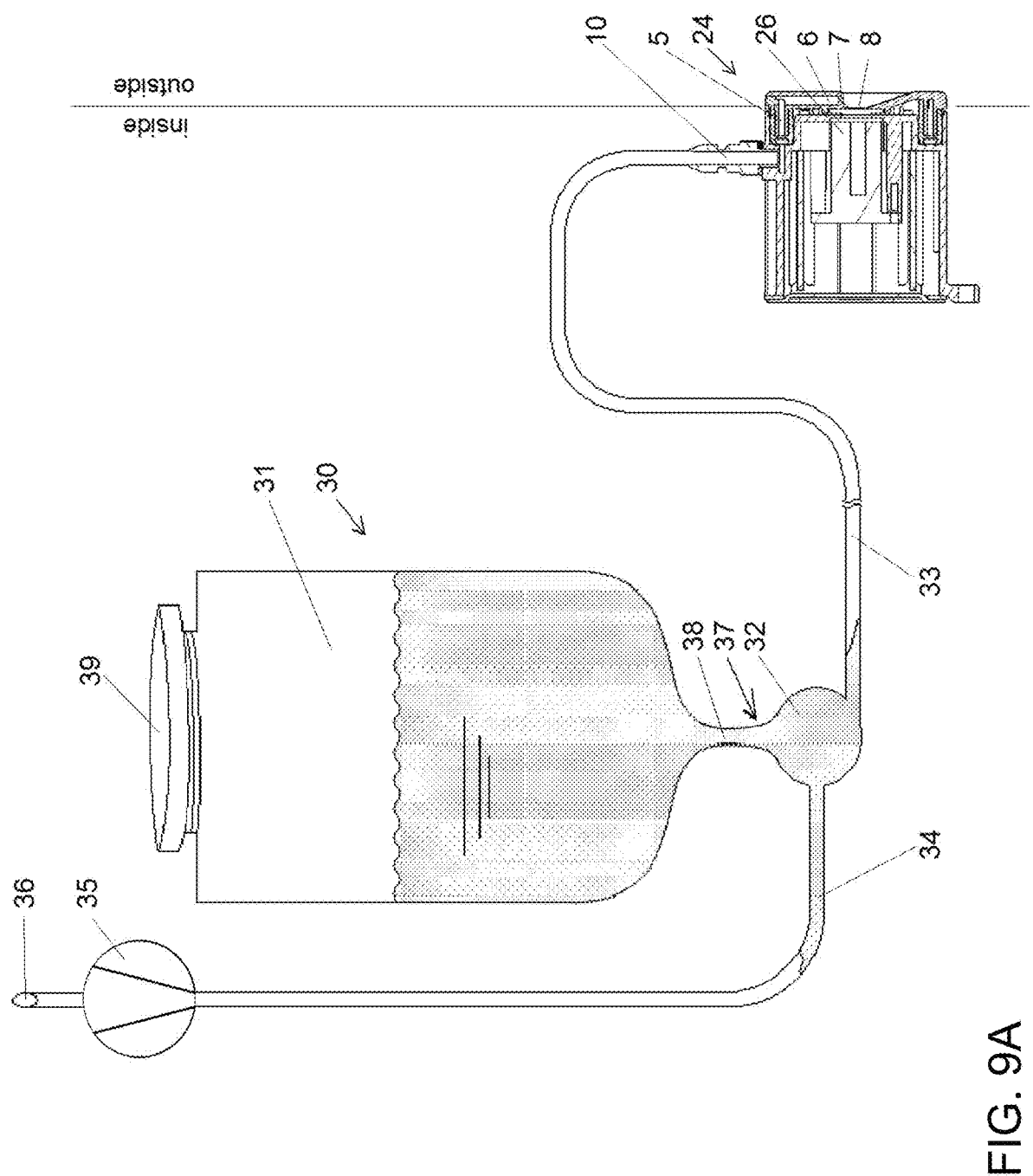
FIG. 9A is a view of the setup of the sensor module's cleaning system, having a liquid tank, an air pump, a reservoir and the sensor device itself, shown with a LIDAR sensor.
Figure 9B:
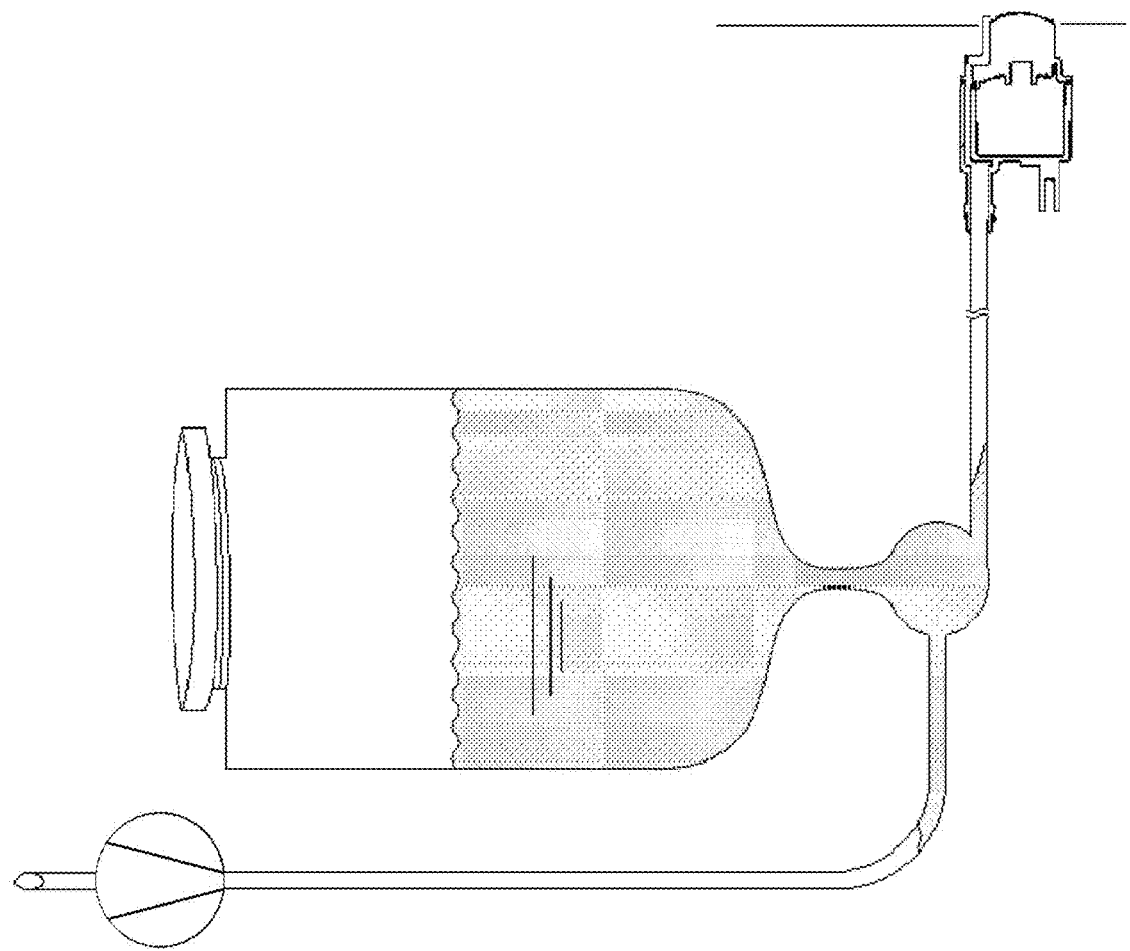
FIG. 9B is a view of the setup of the sensor module's cleaning system, having a liquid tank, an air pump, a reservoir and the sensor device itself, shown with a camera sensor.
Figure 10:
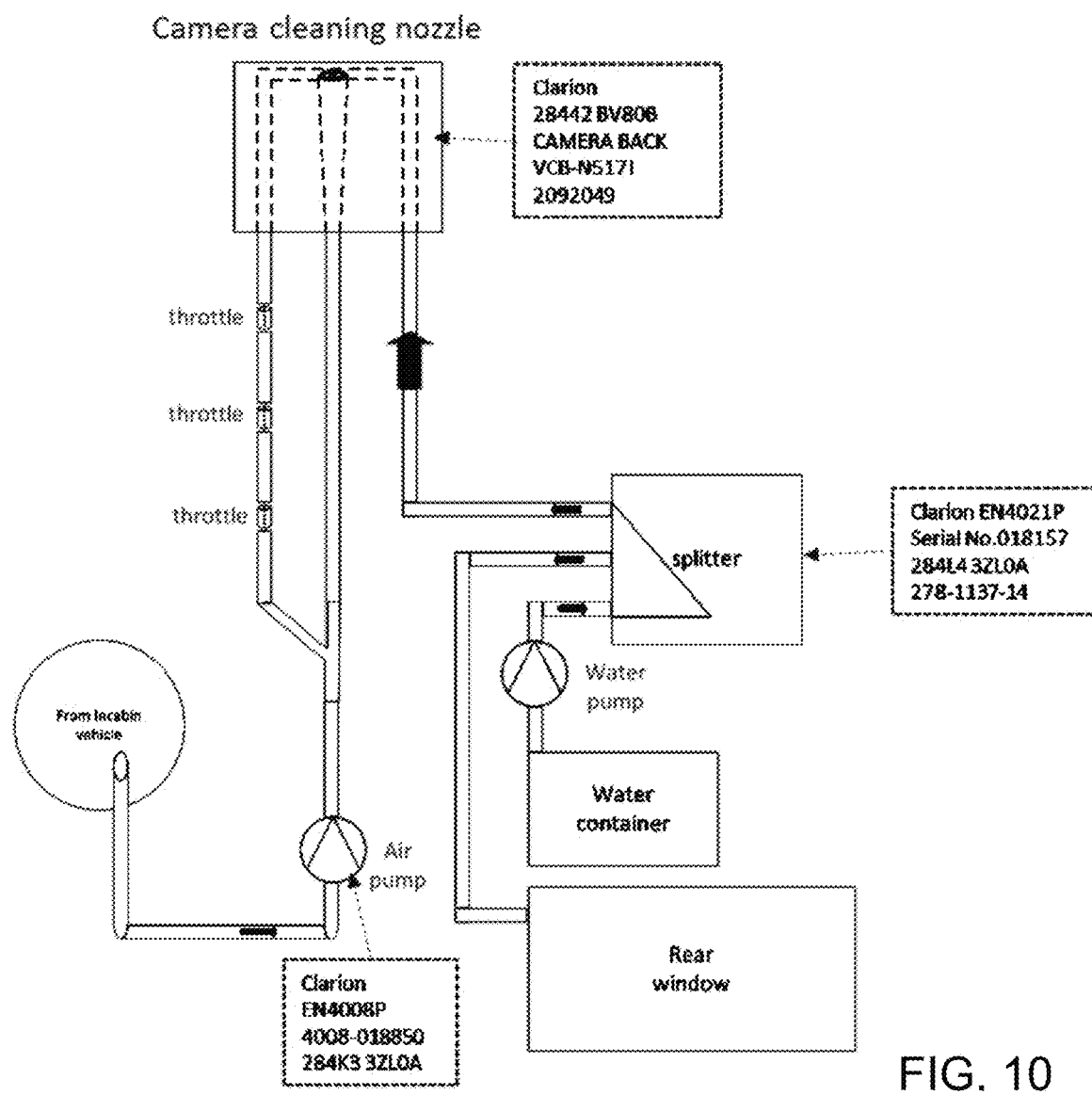
FIG. 10 is a block diagram of a known vehicle rear view camera lens cleaning system.
Figure 11A:
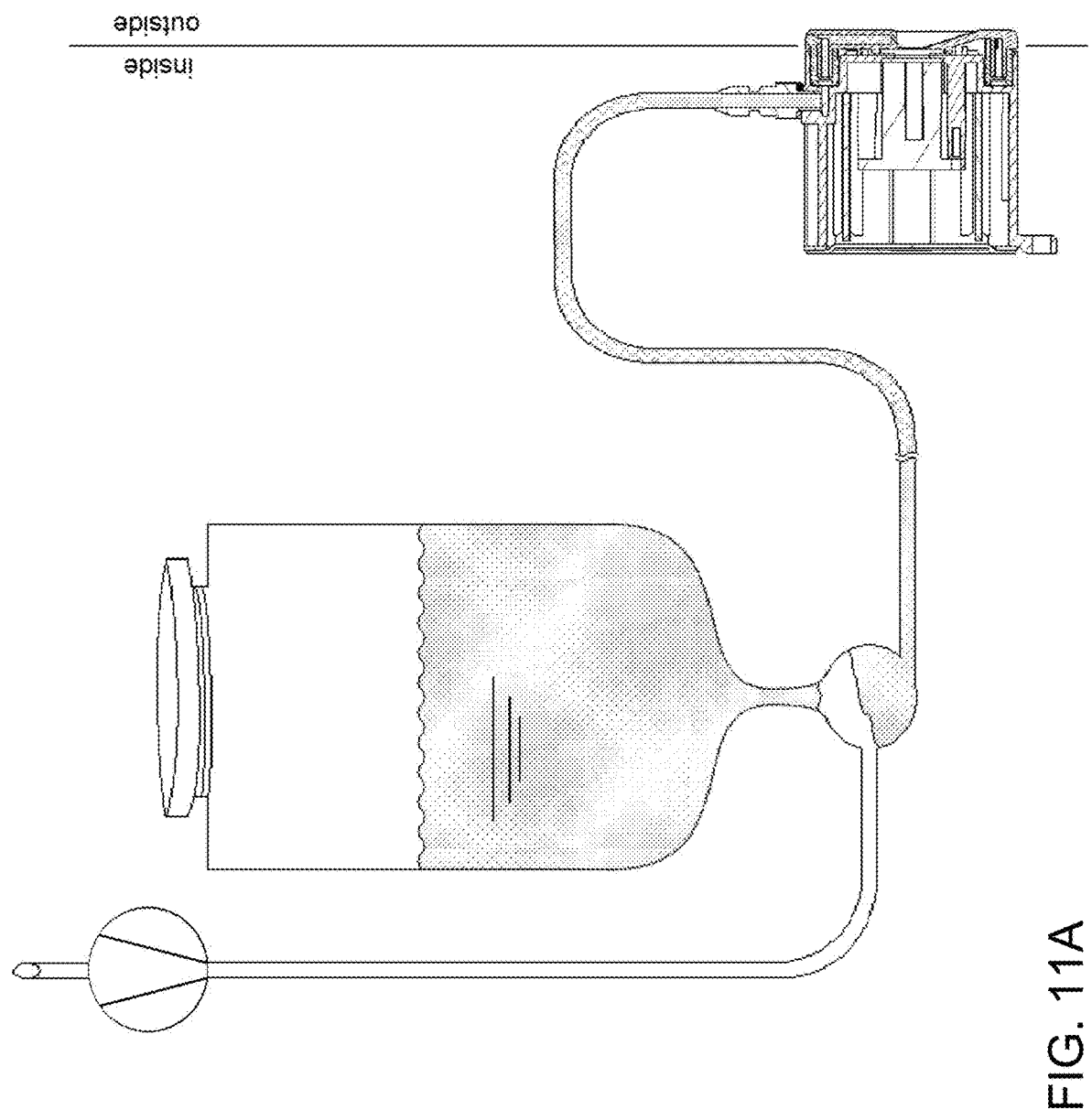
FIGS. 11A and 11B are the sensor module's cleaning system of FIGS. 9A and 9B, respectively, with the reservoir half full, and extruding liquid through the nozzles.
Figure 11B:
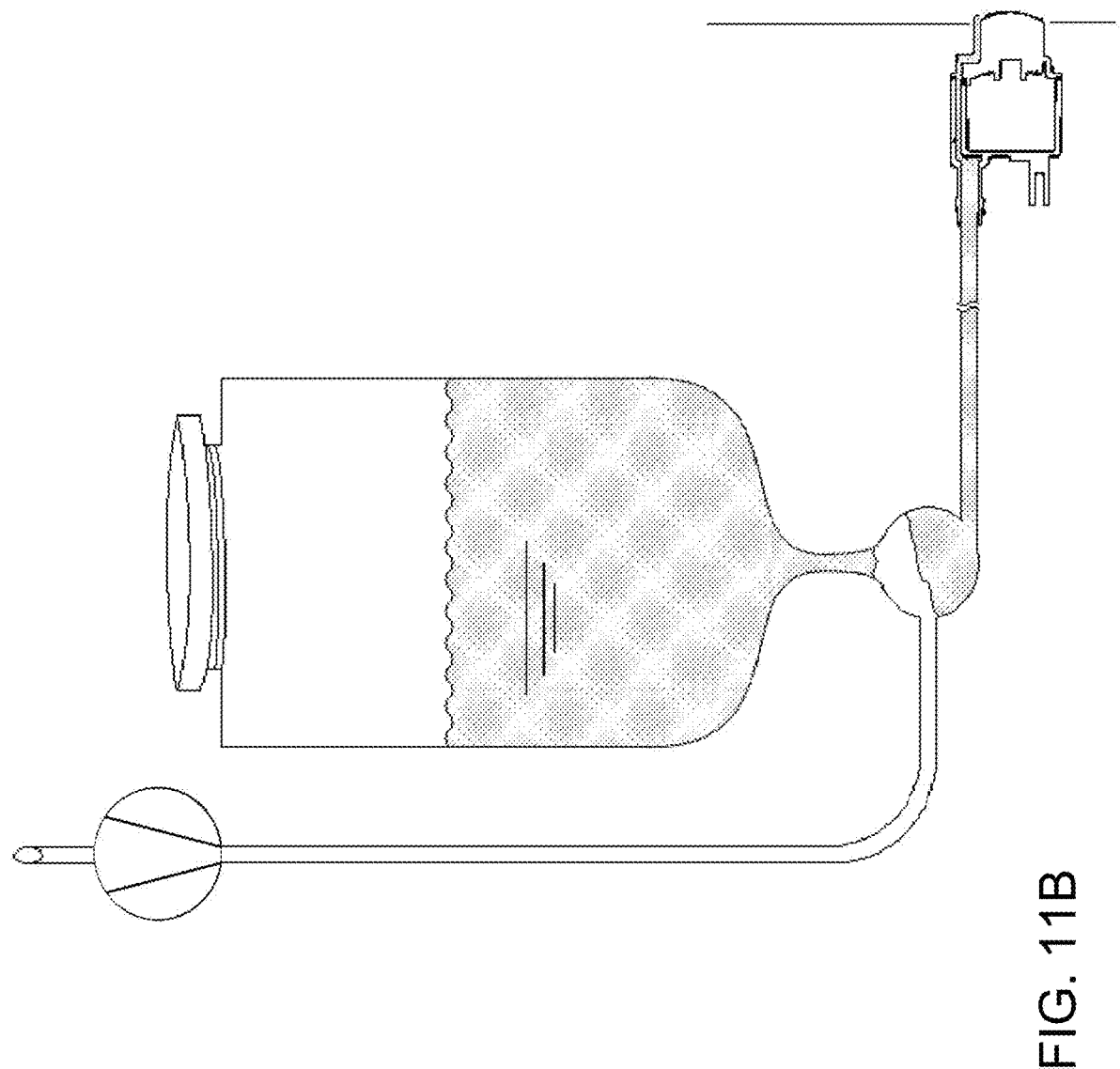
Figure 12A:
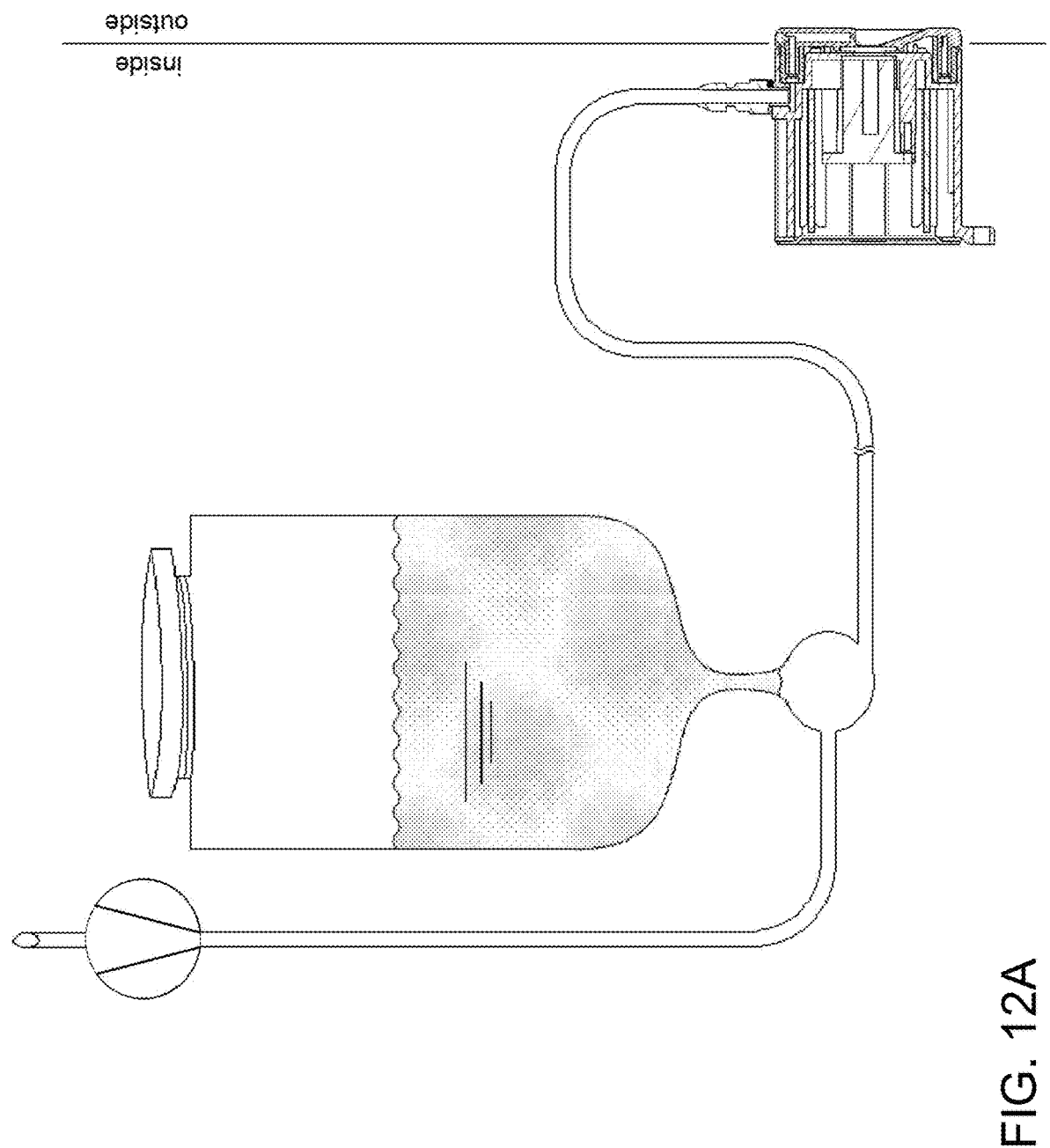
FIGS. 12A and 12B are the sensor module's cleaning system of FIGS. 9A and 9B, respectively, with the reservoir emptied, filled with air instead, and extruding air through the nozzles.
Figure 12B:
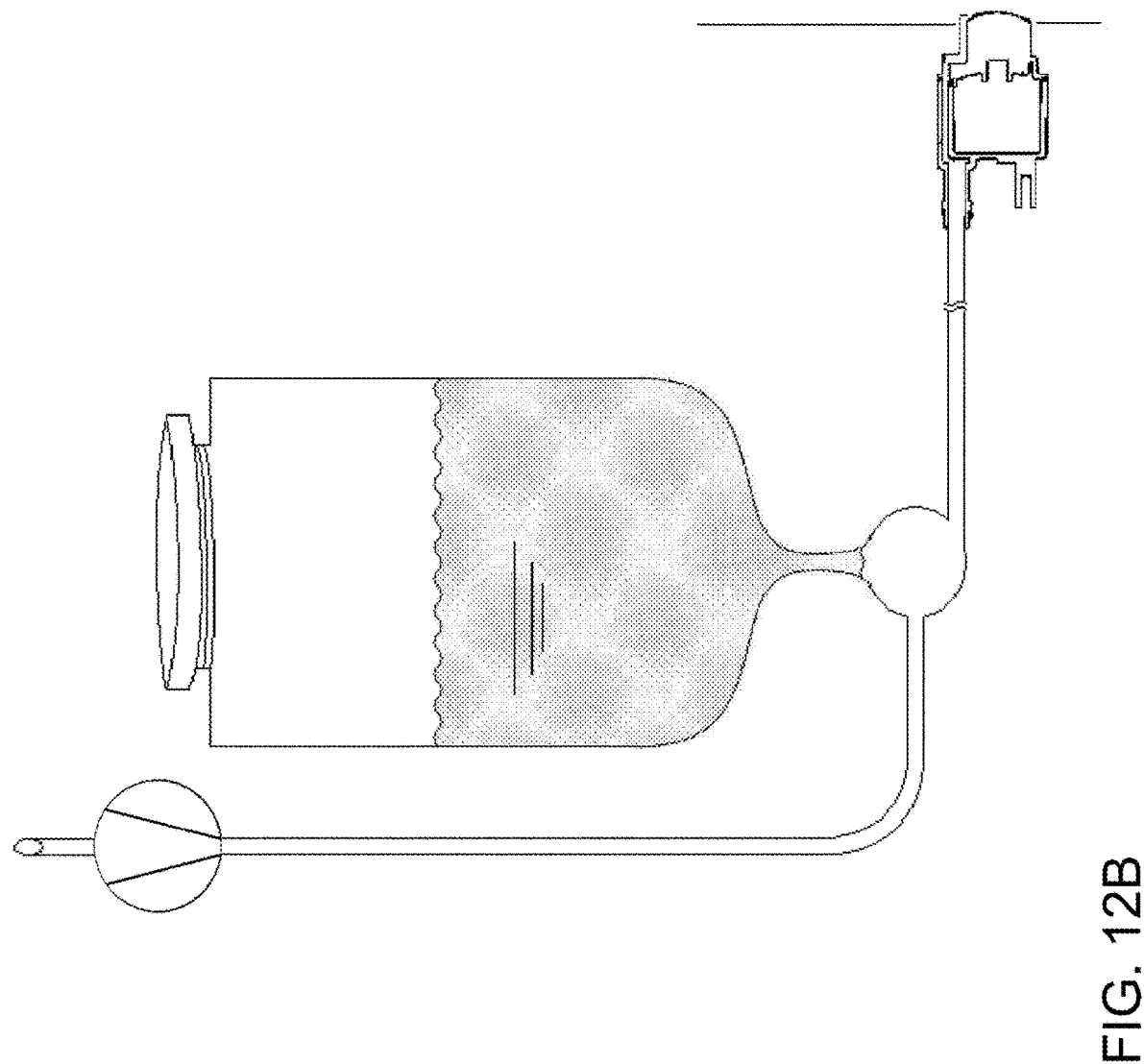

FIGS. 9A and 9B show a cleaning system in accordance with the present invention. In the drawings, the embodiment of FIGS. 9A, 11A, 12A and 13A, is an example with a LIDAR sensor and the embodiment of FIGS. 9B, 11B, 12B and 13B is an example with a camera sensor. The cleaning water tank 30 may include a small reservoir 32 underneath a main tank 31, which is separated from the main tank area by a small [bottle-] neck 38. The assembly may be able to spill water or a different liquid from the tank (for example, an alcohol, an alcohol-water mixture or any other advantageous water mixture with cleaning or antifreeze additives) followed by air by having just a single air pump 35 instead of having an air pump and an additional water pump. A block diagram of a known system with separate pumps is shown in FIG. 10.

When the cleaning system according the present invention is engaged, the air pump 35 gets activated and intakes air at the air intake 36 (for example, from in the vehicle cabin) pressing air through an air hose 34 into the reservoir 32. The air pressure extrudes the liquid through the exiting hose 33, Lidar housing canals 5 and 6 and finally the nozzles 7. While the air pump is running, keeping a certain static pressure in the reservoir upright, no additional liquid can drip from the main tank to the reservoir, see FIGS. 11A and 11B. As soon as all of the liquid from the reservoir 32 has been extruded through the nozzles, the exiting hose, canals and nozzles fall dry, spilling an air stream instead of liquid, shown in FIGS. 12A and 12B. Due to lower friction, the air steam may flow faster than the prior liquid steam.

Figure 13A:
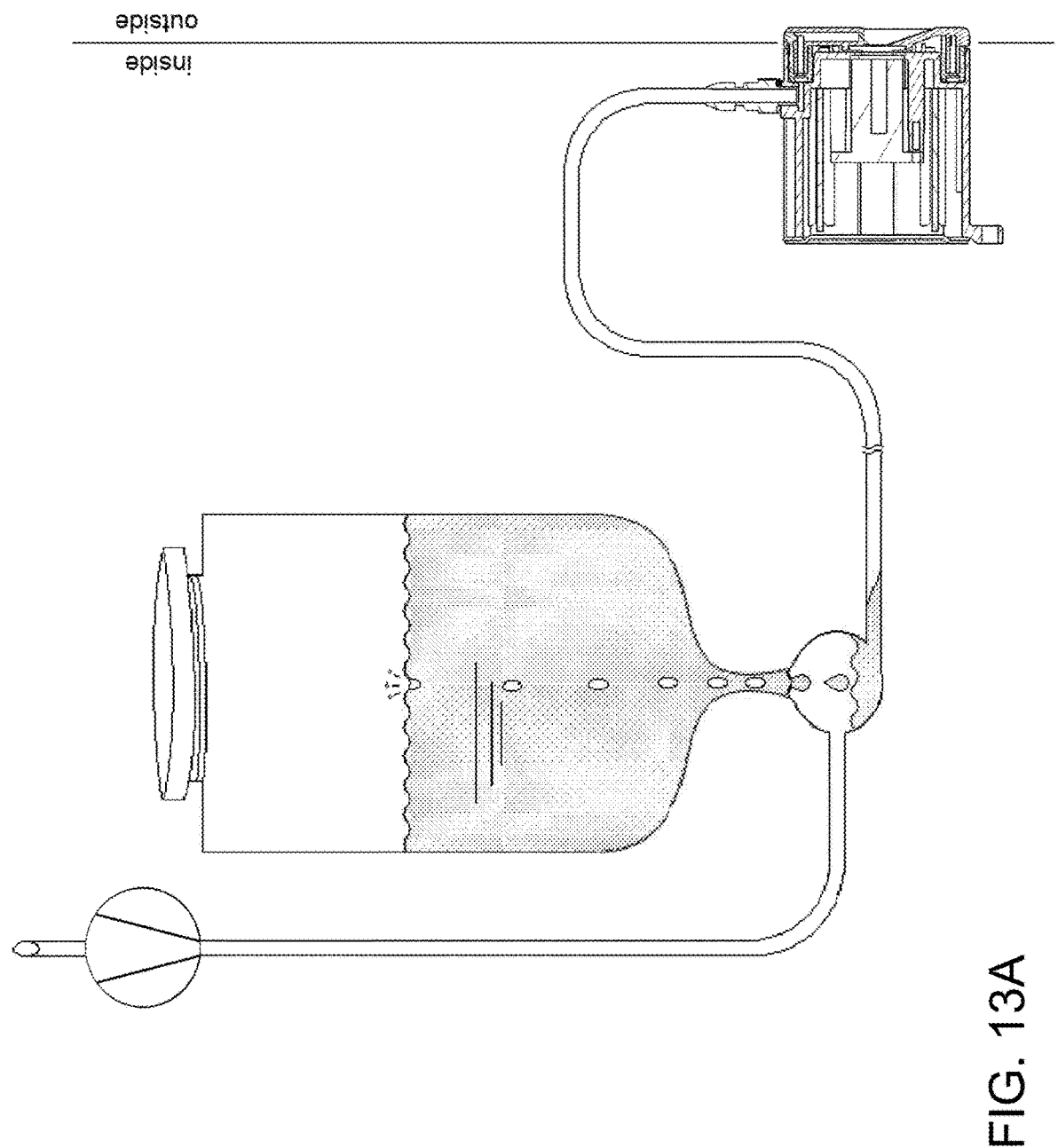
Figure 14:
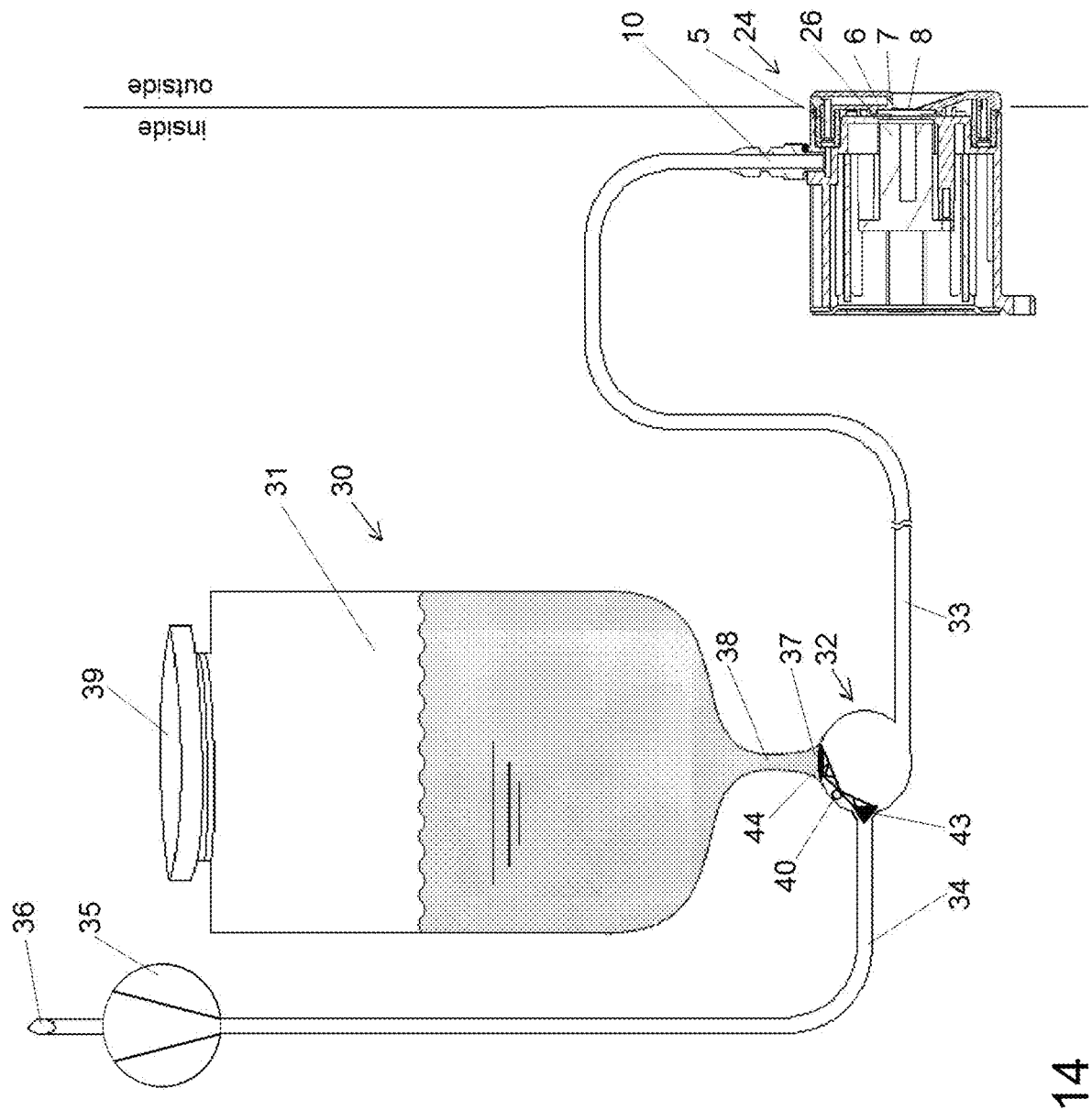
FIG. 14 shows a primitive lever valve shutting the reservoir's liquid intake stopple as long air is flowing through the air intake, pressing onto the air intake stopple, propelled by the air pump.
Figure 15A:
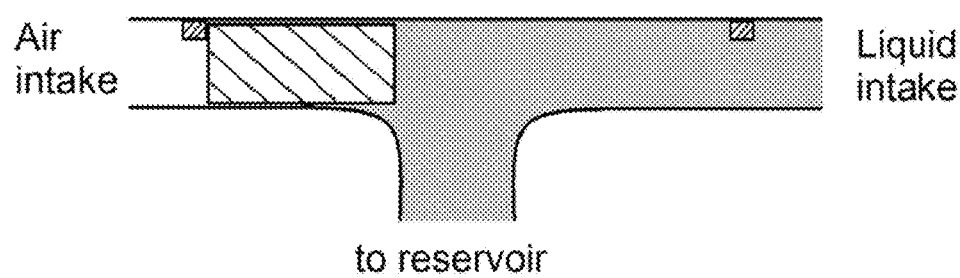
FIGS. 15A-15E show the working principle of a primitive brick play valve, whereby
Figure 15B:
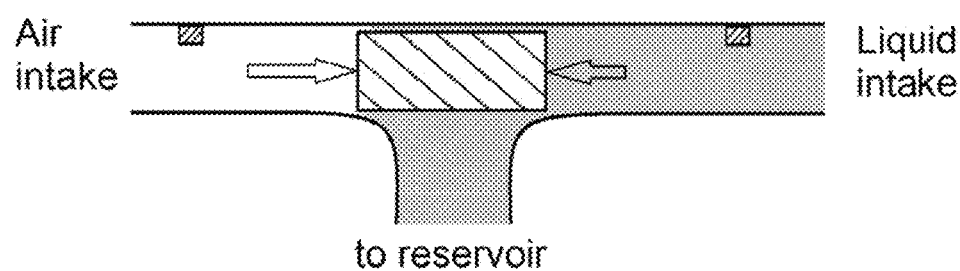
Figure 15C:
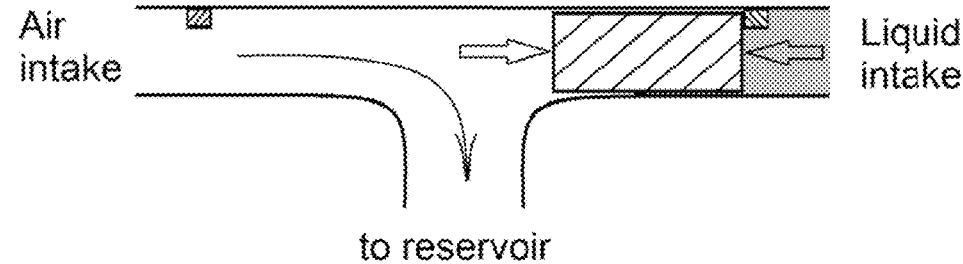
Figure 15D:
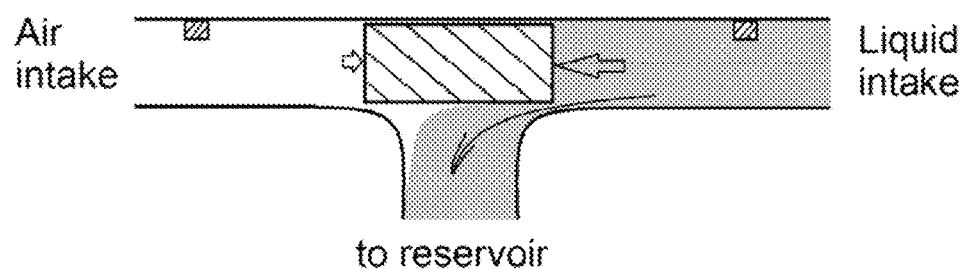
Figure 15E:
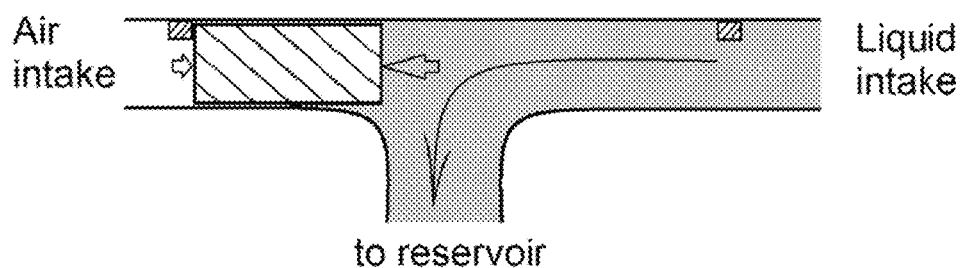
Figure 16:
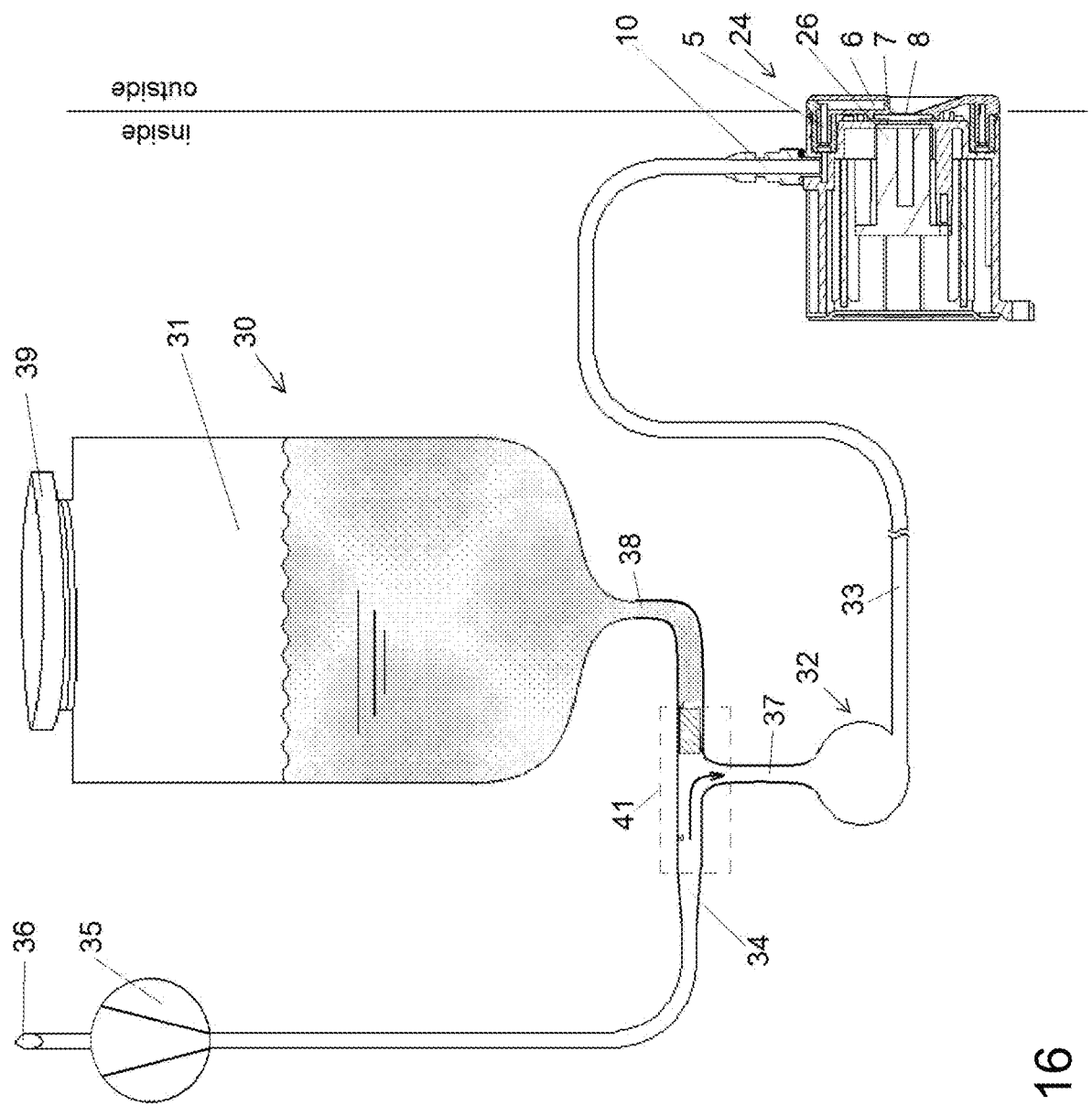
FIG. 16 shows the brick play valve of FIGS. 15A-15E in an assembly of a sensor module's cleaning system similar to that in FIG. 9A, but with having a valve for a more dedicated liquid shut off.

As soon the air pump stops, the static pressure in the reservoir dips, allowing liquid to drip into the reservoir while air bubbles ascend towards the main tank 31, see FIGS. 13A and 13B. This continues until the reservoir is full of liquid again as shown in FIGS. 9A and 9B. Optionally, a valve 40 may find use that shuts the reservoir's liquid intake (by a liquid intake stopple 44) as long as air is flowing through the air intake, propelled by the air pressing on the air intake stopple 43, such as show in FIG. 14. Another valve working principle is shown in detail in FIGS. 15A to 15E and shown as used in the assembly in FIG. 16. Just by shifting a bracket or alternatively a ball either the air intake or the liquid intake may be shut. When the air pressure is higher than the liquid pressure, the bracket is pushed in the direction of the liquid intake (FIG. 15B), allowing the air to flow into the reservoir (FIG. 15C). When the liquid pressure is higher than the air pressure, the bracket is pushed in the direction of the air intake (FIG. 15D), allowing the liquid to flow into the reservoir (FIG. 15E). When the reservoir is full and the air pump doesn't pump, the flow comes to a stop (FIG. 15A).

Figure 23:
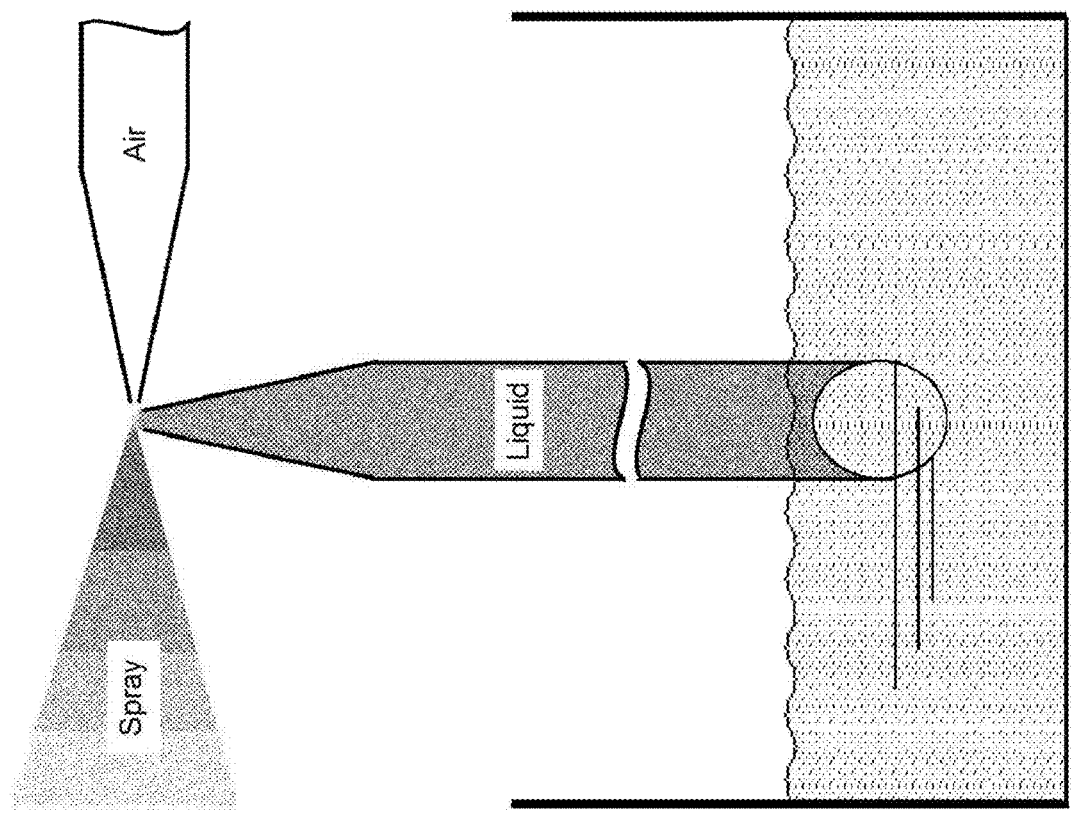
FIG. 23 shows the fixative principle, the air flow out of the air nozzle rips out fluid particles out of the fluid front at the fluid nozzle's peak which are blown away in a spray.
Figure 24:
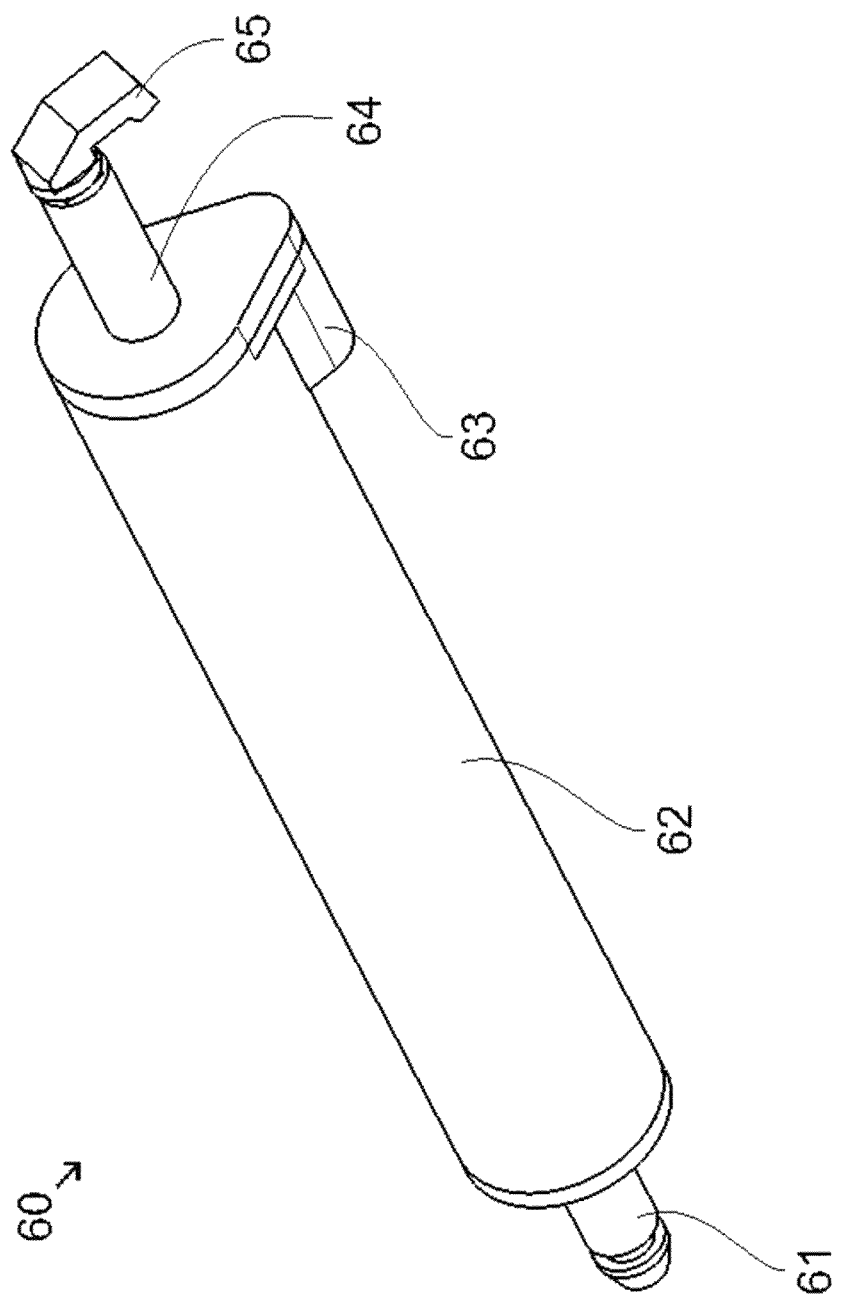
FIG. 24 is a perspective view of an extendable nozzle assembly in accordance with the invention.
Figure 25:
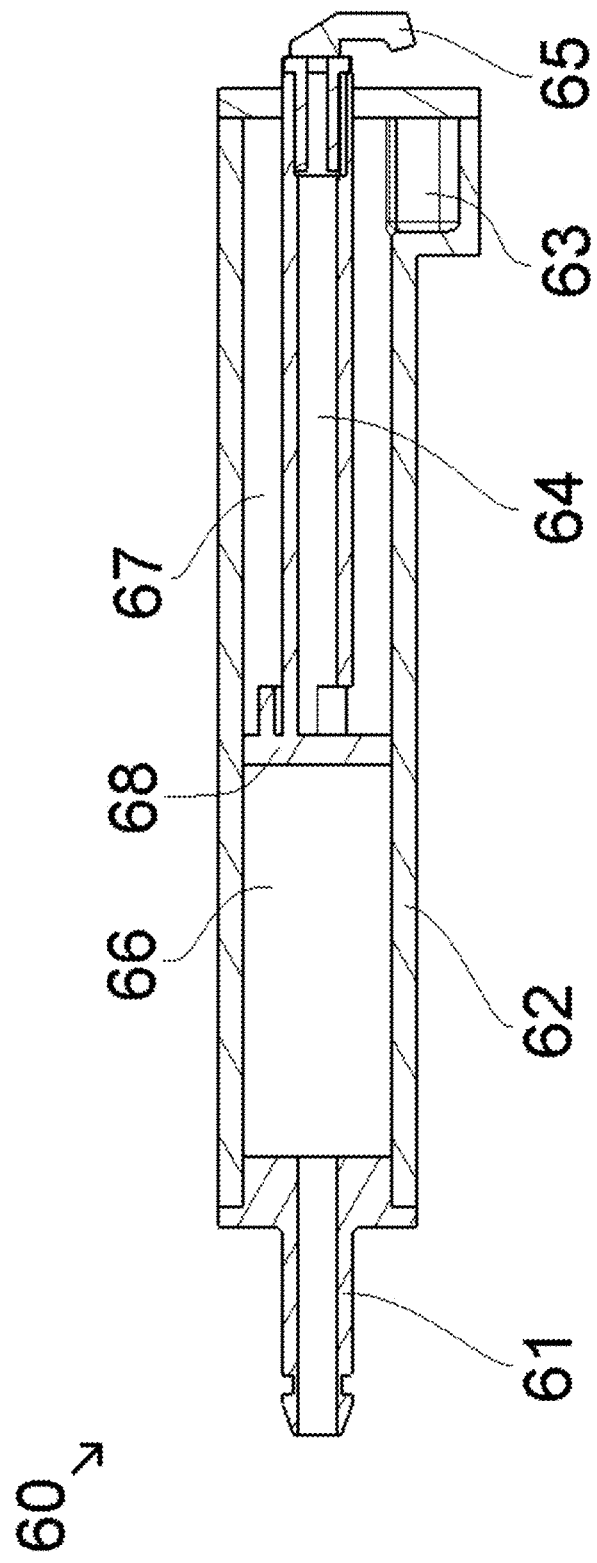
FIG. 25 is a sectional view of the extendable nozzle assembly of FIG. 24, shown with the stamp in its resting (retracted) position.
Figure 26:
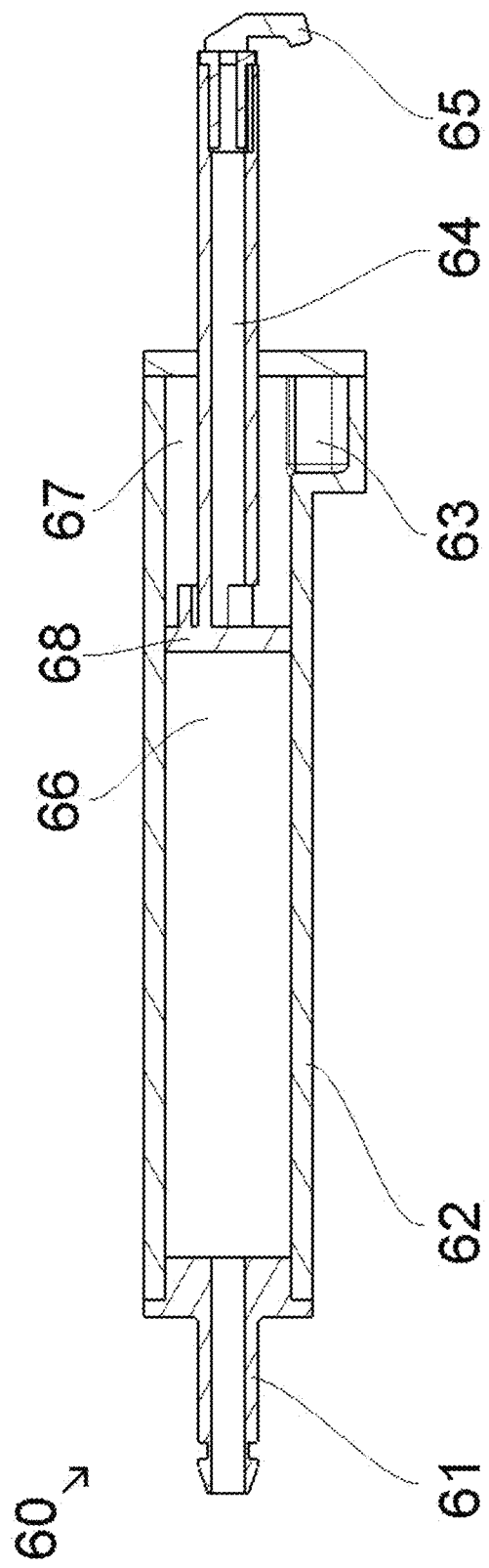
FIG. 26 is another sectional view of the extendable nozzle assembly of FIG. 24, shown with the stamp at the beginning of actuation, half way extended.

Optionally, the nozzles are configured in a way to extrude the liquid as a spray. Optionally, a fixative principle, such as shown in FIG. 23, may be used first to draw or suck liquid from a liquid tank or reservoir and second to produce a spray. Optionally, the liquid and/or air nozzles may extend when liquid or air pressure is applied, either in a turning or bending movement or by telescopic means, such as known from vehicle head lamp washer systems or lawn sprinklers. An example of such extendable nozzle system 60 is shown in FIGS. 24 and 25, using a cylinder 62 having a piston 64 and stamp 68 that is extended by the water (or liquid or air) pressure to the intake 61. FIG. 25 shows a sectional view of the extendable nozzle system 60 at its unactuated condition, where the stamp is fully retracted. The air room 67 and the tube may be mostly filled by air. FIG. 26 is another sectional view of the extendable nozzle system at the beginning of actuation, just extending. Water (or liquid or air) gets pressed into the water room through the intake, pushing the stamp in or toward the extending direction. A spring may be also in the piston, which spring force is directed against the extending direction.

Figure 27:
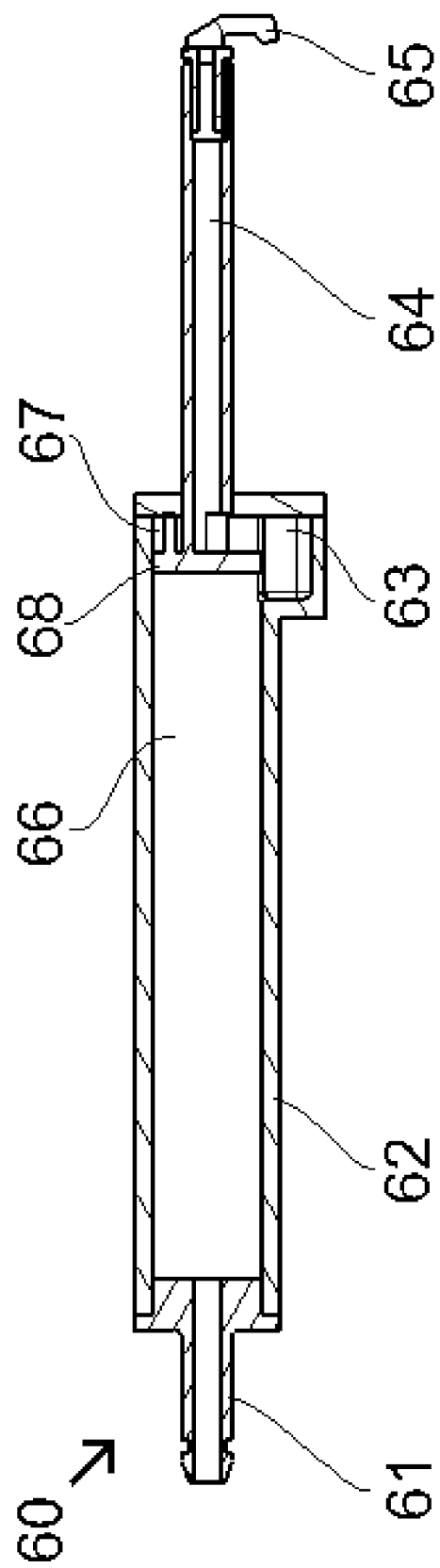
FIG. 27 is another sectional view of the extendable nozzle assembly of FIG. 24, shown with the stamp fully extended.

The stamp is half way extended in FIG. 26. Air from the air room gets extended through the tube and nozzle 65. As soon the stamp has been pushed beyond the edge of the bypass section 63, water (or liquid or air) from the water room can enter the air room, the tube and finally the fully extended nozzle which is then dispensing or spraying water (or liquid or air), shown in FIG. 27. When the water (or liquid or air) pumping through the intake is shut off, the spring force of the spring will press the stamp, tube and nozzle portion back into the resting position as shown in FIG. 25.

During the retraction the air room space is expanding. Due to that there is an under pressure in the air room, hence the remaining water (or liquid or air) in the nozzle and tube is sucked from the nozzle and the tube into the air room, whereby the nozzle will be free of water and will not freeze at low temperatures. The water (or liquid or air) of the water room may be pushed back to the reservoir system when the stamp is retreating into the resting position. As an additional advantageous property of the piston based extendable nozzle system shown in The FIGS. 24-27, the nozzle can do without having an additional non return valve (or unidirectional restrictor valve) at the tube (as is typically required in known vehicle washer systems for preventing water (or liquid) from remaining in the tube and nozzle).

As an optional property of the washer system, the extendable nozzle may oscillate at the last millimeters of extracting. This may be done since when the stamp is passing the edge of the bypass section, the pressure to the piston may drop substantially so that the spring force can push the piston back over the edge, before the extending takes place again, and so forth. The oscillation may optionally be used to cover a larger area that is dispensed or sprayed to, or optionally the angle at which the sprayed or dispensed fluid (liquid, water or air) hits the to-be-cleaned or deiced sensor device may be varied by the oscillation. Optionally, the pressure of the spayed or dispensed fluid may be varied by the oscillation. Optionally, the extendable dispenser may be combined with solutions specified above, dispensing air or liquid consecutively, propelled by just one pump.

Figure 17:
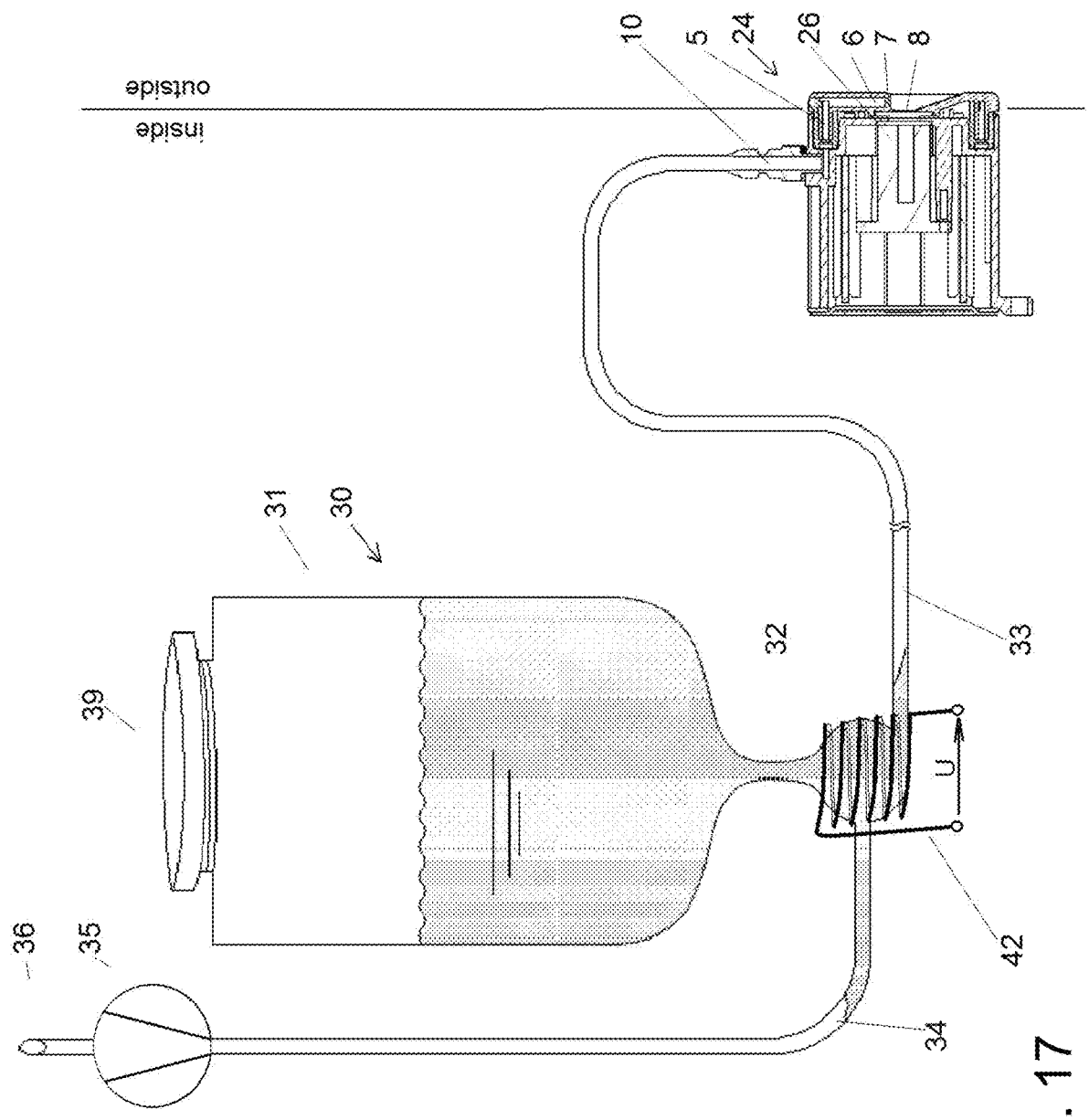
FIG. 17 shows the sensor module's cleaning system with an electrical heating element placed at the reservoir for heating a limited liquid portion.
Figure 18:
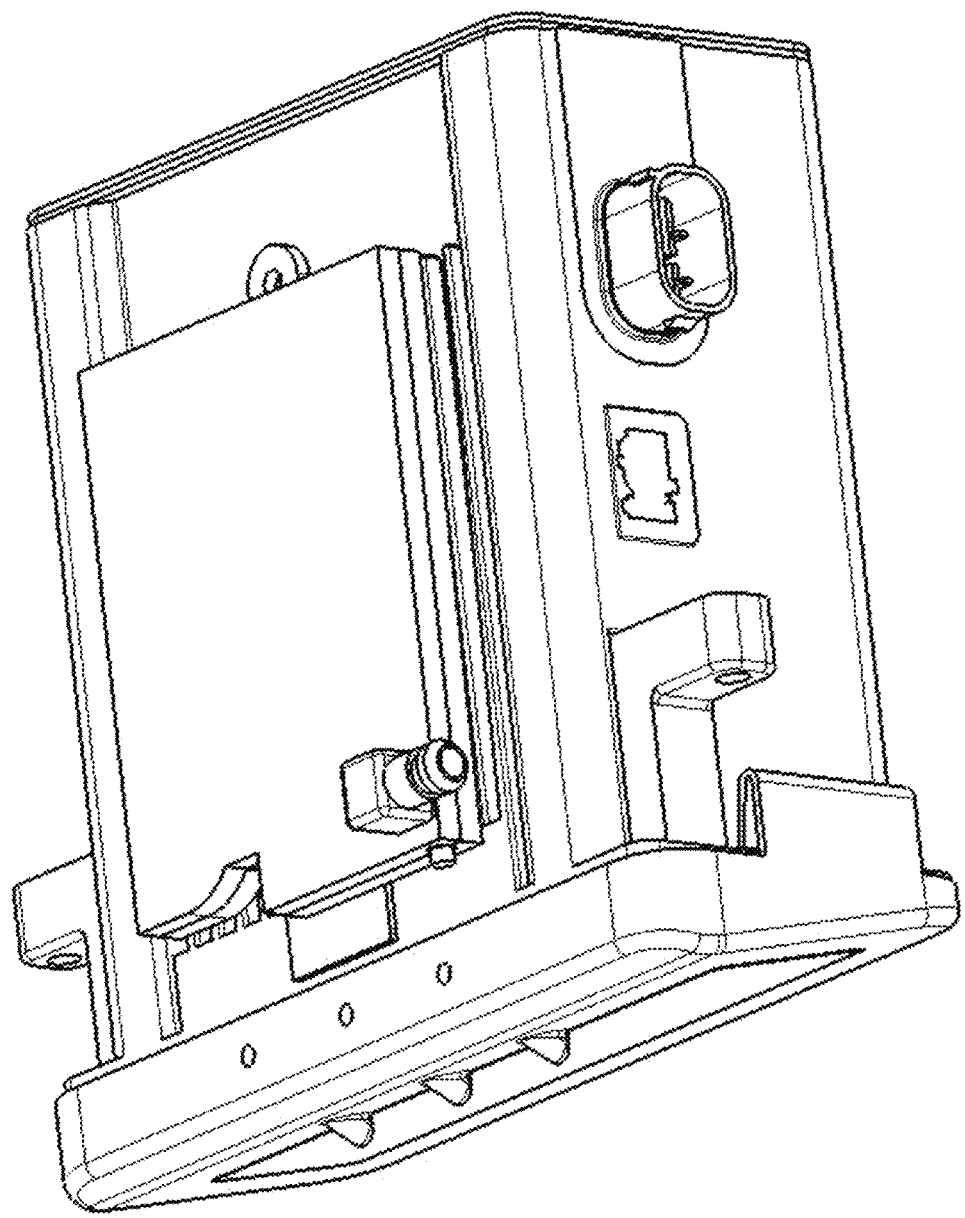
FIGS. 18-22 are views of a sheath heater device 50 put on top a LIDAR sensor device for pre-heating a washing fluid or air for cleaning the sensor's front lid, where
Figure 19:
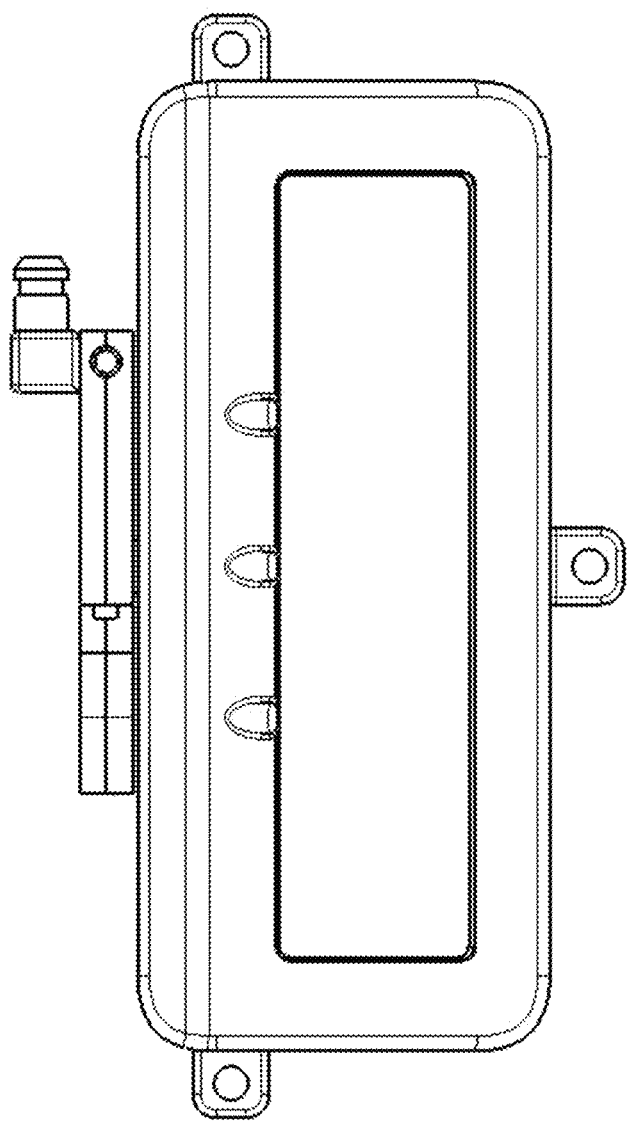
Figure 20:
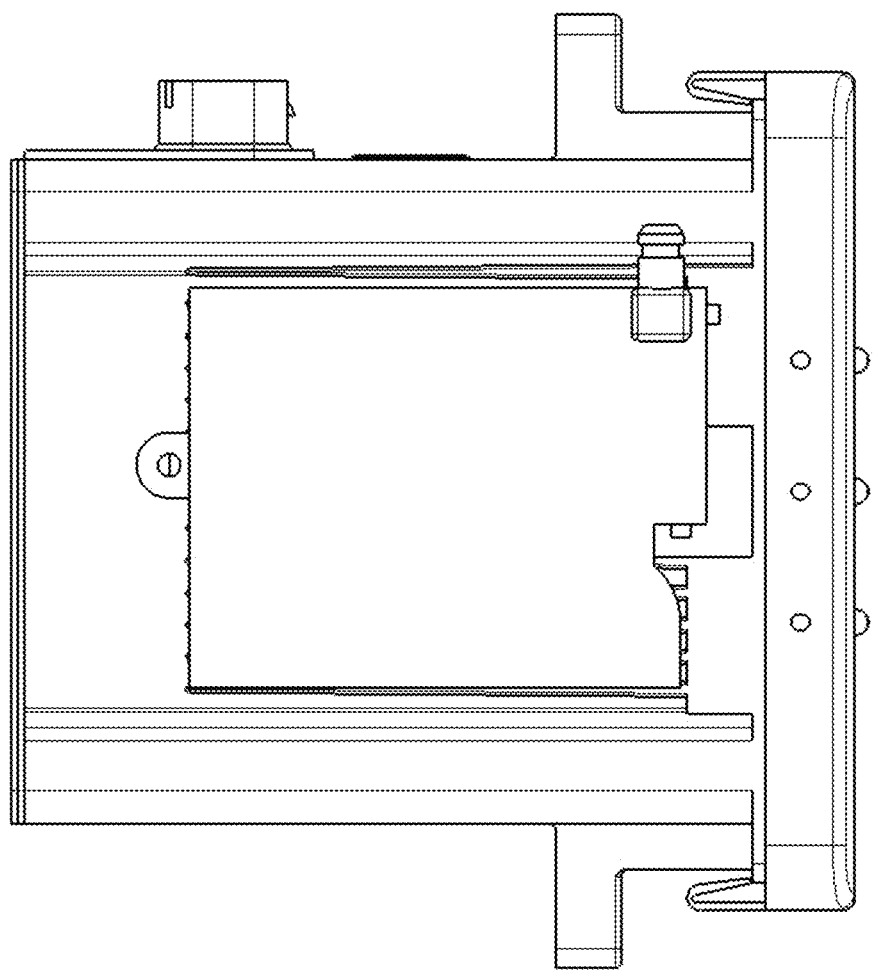
Figure 21:
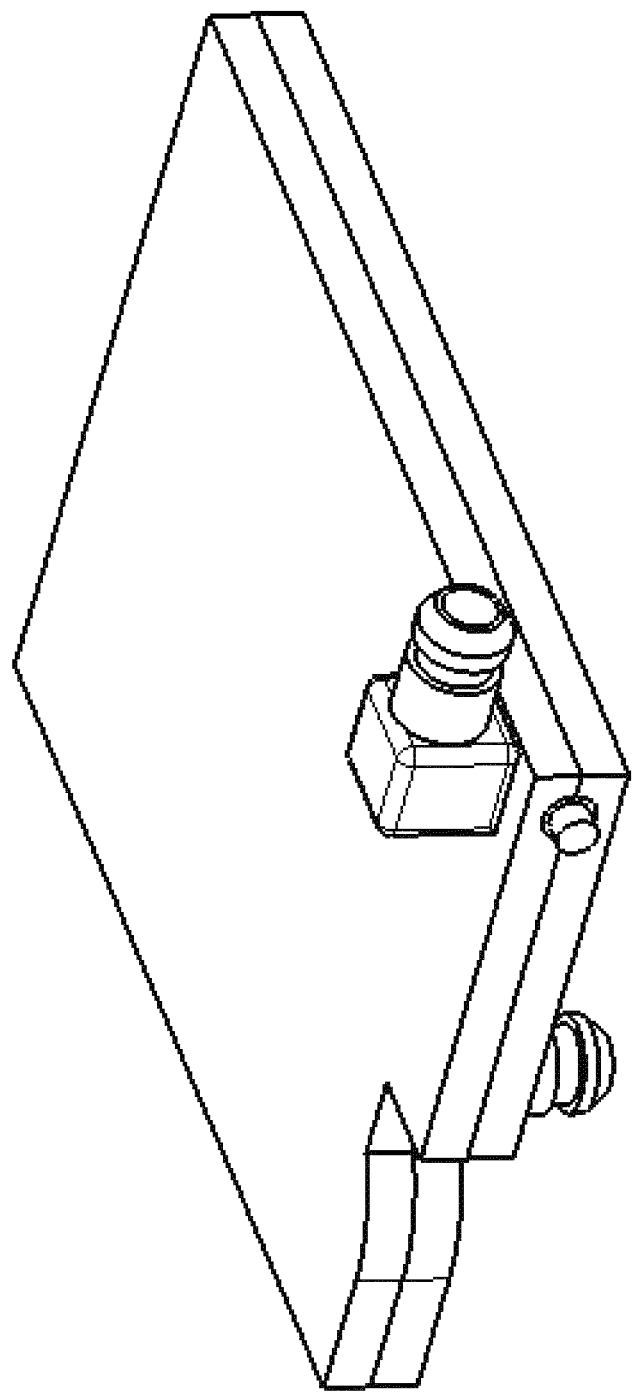
Figure 22:
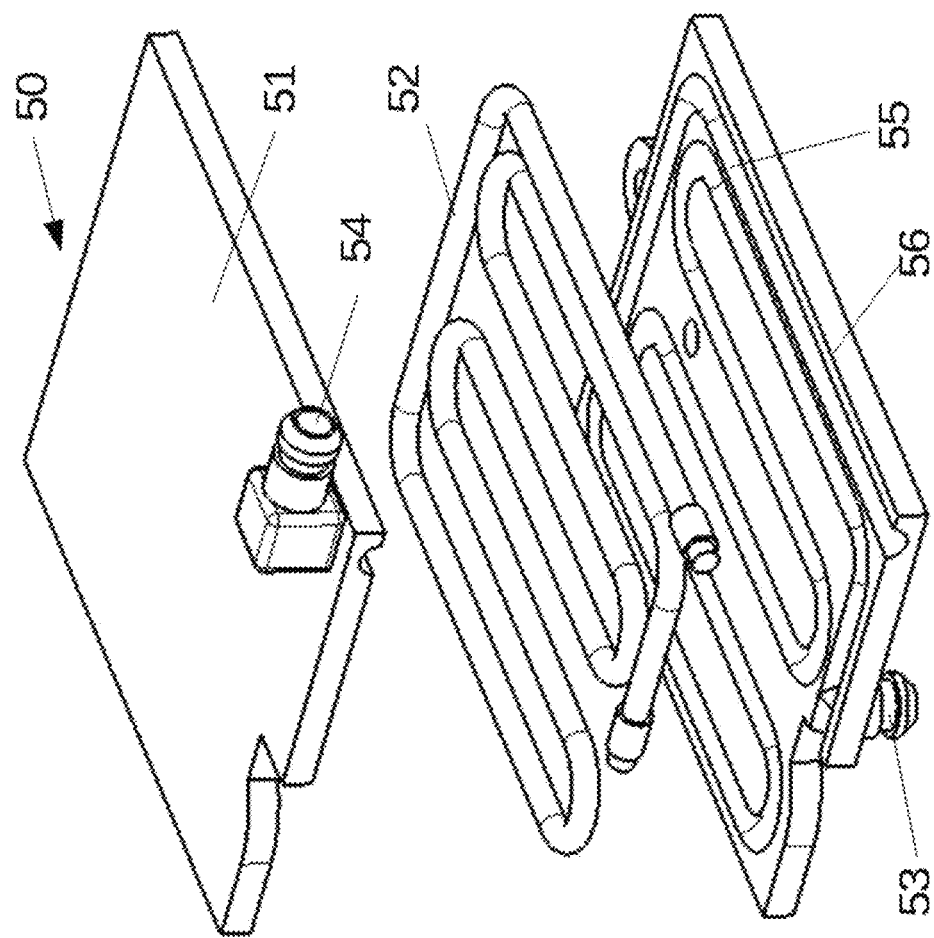

Optionally, the air flow may be heated for defrosting the window. Optionally, the liquid or water may be heated alternatively or additionally. Optionally, the liquid heating element 42 may be placed at the reservoir 32 for heating a limited liquid portion (of the size of the reservoir), such as shown in FIG. 17. Optionally, the liquid or water may be heated overcritical. Optionally, an alternative heating element may be placed at the water canals, optionally comprising sheath (or jacket) heating. As an example of such a sheath (or jacket) heating, FIGS. 18-22 show a sheath heater device 50 put on top a LIDAR sensor device 26 for preheating a washing fluid or air for cleaning the Lidar's front lid. Optionally, the liquid or water may be heated so that it partially or fully enters the gas state. Optionally, the heating of the liquid may be used to produce pressure for extruding (propelling) the liquid or gas, optionally instead of having any pump or a reduced number of pumps. Optionally, the liquid or water and/or air absorbs some of the heat generated by the sensor electronics (e. g. camera or Lidar). Optionally, the liquid, water or air flow additionally serves as a cooling medium for the camera or Lidar sensor electronics. Optionally, the liquid, water or air flow may be engaged not just for cleaning but also when the LIDAR is operating.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484 and/or U.S. Publication Nos. US-2018-0015875; US-2017-0356994; US-2017-0315231; US-2017-0276788; US-2017-0254873; US-2017-0222311 and/or US-2010-0245066, and/or U.S. patent application Ser. No. 15/675,919, filed Aug. 14, 2017, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A sensing system for a vehicle, said sensing system comprising:
a sensor module configured to be disposed at a vehicle equipped with said sensing system;
wherein said sensor module comprises a sensor housed in a housing;
wherein said housing comprises a mounting portion and a cover portion, and wherein said mounting portion is configured to attach at a portion of the equipped vehicle such that said cover portion is exterior of the vehicle;
wherein said cover portion is removably attached at said mounting portion and includes tamper resistant attaching elements such that an attempt to remove said cover portion from said mounting portion damages said sensor module;
a control, wherein an output of said sensor is communicated to said control, and wherein said control, with said sensor module disposed at the vehicle, and responsive to said output of said sensor, determines the presence of one or more objects exterior the vehicle and within the field of sensing of said sensor;
wherein said cover portion snap attaches at said mounting portion to seal said sensor and associated circuitry therein; and
wherein said cover portion is removable from said mounting portion via a plurality of release rods that are insertable through release holes established through said cover portion to cause release of said tamper resistant attaching elements.

2. The sensing system of claim 1, wherein said tamper resistant attaching elements comprise a plurality of flexible tabs that engage corresponding structure at said mounting portion.

3. The sensing system of claim 1, wherein said housing includes a fluid port for connecting to a fluid supply, and wherein, responsive to fluid supplied to said fluid port, said housing is configured to direct fluid onto a window of said cover portion through which said sensor senses.

4. The sensing system of claim 3, wherein said fluid port is part of said mounting portion of said housing, and wherein said cover portion includes a fluid channel that is in fluid communication with a fluid channel of said fluid port when said cover portion is attached at said mounting portion.

5. The sensing system of claim 4, wherein said fluid channel of said fluid port comprises a tube that is at least partially surrounded by a heating device that, when activated, heats fluid flowing through said fluid channel of said fluid port.

6. The sensing system of claim 4, wherein said fluid channel of said fluid port is configured to have liquid or gas flow therethrough responsive to a single pump.

7. The sensing system of claim 4, wherein said fluid channel of said fluid port provides fluid at a nozzle that directs pressurized fluid onto the window of said cover portion through which said sensor senses.

8. The sensing system of claim 7, wherein said nozzle comprises an extendable nozzle, and wherein, when pressurized fluid is not supplied, said extendable nozzle is retracted to a retracted position and, when pressurized fluid is supplied, said extendable nozzle extends to an extended position to direct pressurized fluid onto the window of said cover portion.

9. The sensing system of claim 8, wherein said nozzle is biased toward the retracted position such that said nozzle returns to the retracted position when the supply of pressurized fluid stops.

10. The sensing system of claim 9, wherein said nozzle comprises a water chamber and an air chamber separated by a movable element and a bypass channel connecting the water chamber and the air chamber, and wherein the connection opens when said nozzle is in the extended position.

11. The sensing system of claim 10, wherein fluid inside said nozzle is drawn into the air chamber due to under pressure in the air chamber when the movable element is moved back as said nozzle is retracted.

12. The sensing system of claim 3, wherein said housing includes a second fluid port for providing a second medium at said sensor module.

13. The sensing system of claim 12, wherein the fluid supplied at said fluid port comprises a liquid and wherein the second medium provided at said second fluid port comprises air.

14. A sensing system for a vehicle, said sensing system comprising:
   a sensor module configured to be disposed at a vehicle equipped with said sensing system;
   wherein said sensor module comprises a sensor housed in a housing;
   wherein said housing comprises a mounting portion and a cover portion, and wherein said mounting portion is configured to attach at a portion of the equipped vehicle such that said cover portion is exterior of the vehicle;
   wherein said cover portion is removably attached at said mounting portion;
   wherein said housing includes a supply fluid port for connecting to a fluid supply and wherein said housing includes a nozzle that, responsive to fluid supplied to said supply fluid port, directs fluid onto a window of said cover portion through which said sensor senses;
   wherein said supply fluid port is part of said mounting portion of said housing, and wherein said cover portion includes a fluid channel that is in fluid communication with said supply fluid port when said cover portion is attached at said mounting portion, and wherein said cover portion includes said nozzle;
   wherein, responsive to fluid supplied to said supply fluid port, said fluid channel provides fluid at said nozzle and said nozzle directs pressurized fluid onto the window of said cover portion through which said sensor senses;
   a control, wherein an output of said sensor is communicated to said control, and wherein said control, with said sensor module disposed at the vehicle, and responsive to said output of said sensor, determines the presence of one or more objects exterior the vehicle and within the field of sensing of said sensor; and
   wherein said cover portion includes tamper resistant attaching elements such that an attempt to remove said cover portion from said mounting portion damages said sensor module, and wherein said tamper resistant attaching elements comprise a plurality of flexible tabs that engage corresponding structure at said mounting portion, and wherein said cover portion is removable from said mounting portion via a plurality of release rods that are insertable through release holes established through said cover portion to cause release of said flexible tabs from said structure at said mounting portion.

15. A sensing system for a vehicle, said sensing system comprising:
   a sensor module configured to be disposed at a vehicle equipped with said sensing system;
   wherein said sensor module comprises a sensor housed in a housing;
   wherein said housing comprises a mounting portion and a cover portion, and wherein said mounting portion is configured to attach at a portion of the equipped vehicle such that said cover portion is exterior of the vehicle;
   wherein said housing includes a supply fluid port for connecting to a fluid supply and wherein said housing includes a nozzle that, responsive to fluid supplied to said supply fluid port, directs fluid onto a window of said cover portion through which said sensor senses;
   wherein, responsive to fluid supplied to said supply fluid port, a fluid channel provides fluid at said nozzle and said nozzle directs pressurized fluid onto the window of said cover portion through which said sensor senses;
   wherein said nozzle comprises an extendable nozzle, and wherein, when pressurized fluid is not supplied, said extendable nozzle is retracted to a retracted position and, when pressurized fluid is supplied, said extendable nozzle extends to an extended position to direct pressurized fluid onto the window of said cover portion;
   a control, wherein an output of said sensor is communicated to said control, and wherein said control, with said sensor module disposed at the vehicle, and responsive to said output of said sensor, determines the presence of one or more objects exterior the vehicle and within the field of sensing of said sensor; and
   wherein said cover portion is removably attached at said mounting portion and includes tamper resistant attaching elements such that an attempt to remove said cover portion from said mounting portion damages said sensor module, and wherein said tamper resistant attaching elements comprise a plurality of flexible tabs that engage corresponding structure at said mounting portion, and wherein said cover portion snap attaches at said mounting portion to seal said sensor and associated circuitry therein, and wherein said cover portion is removable from said mounting portion via a plurality of release rods that are insertable through release holes established through said cover portion to cause release of said tamper resistant attaching elements.

16. The sensing system of claim 15, wherein said fluid channel is configured to have liquid or gas flow therethrough responsive to a single pump.

17. The sensing system of claim 15, wherein said nozzle is biased toward the retracted position such that said nozzle returns to the retracted position when the supply of pressurized fluid stops.

18. A sensing system for a vehicle, said sensing system comprising:

a sensor module configured to be disposed at a vehicle equipped with said sensing system;

wherein said sensor module comprises a sensor housed in a housing;

wherein said housing comprises a mounting portion and a cover portion, and wherein said mounting portion is configured to attach at a portion of the equipped vehicle such that said cover portion is exterior of the vehicle;

wherein said housing includes a supply fluid port for connecting to a fluid supply and wherein said housing includes a nozzle that, responsive to fluid supplied to said supply fluid port, directs fluid onto a window of said cover portion through which said sensor senses;

wherein, responsive to fluid supplied to said supply fluid port, a fluid channel provides fluid at said nozzle and said nozzle directs pressurized fluid onto the window of said cover portion through which said sensor senses;

wherein said nozzle comprises an extendable nozzle, and wherein, when pressurized fluid is not supplied, said extendable nozzle is retracted to a retracted position and, when pressurized fluid is supplied, said extendable nozzle extends to an extended position to direct pressurized fluid onto the window of said cover portion;

a control, wherein an output of said sensor is communicated to said control, and wherein said control, with said sensor module disposed at the vehicle, and responsive to said output of said sensor, determines the presence of one or more objects exterior the vehicle and within the field of sensing of said sensor;

wherein said nozzle is biased toward the retracted position such that said nozzle returns to the retracted position when the supply of pressurized fluid stops; and wherein said nozzle comprises a water chamber and an air chamber separated by a movable element and a bypass channel connecting the water chamber and the air chamber, and wherein the connection opens when said nozzle is in the extended position.

19. The sensing system of claim 18, wherein said cover portion snap attaches at said mounting portion to seal said sensor and associated circuitry therein.

20. The sensing system of claim 18, wherein said sensor comprises at least one Lidar sensor.

21. The sensing system of claim 18, wherein said sensing system provides object detection for at least one of automated parking, blind spot detection, cross traffic alert, lane change and merge aid, automatic emergency braking, pedestrian detection, turn assist, and intersection collision mitigation.

22. The sensing system of claim 18, wherein said supply fluid port comprises a tube that is at least partially surrounded by a heating device that, when activated, heats fluid flowing through said tube.

23. The sensing system of claim 18, wherein fluid inside said nozzle is drawn into the air chamber due to under pressure in the air chamber when the movable element is moved back as said nozzle is retracted.

* * * * *